(12) United States Patent
Koskela et al.

(10) Patent No.: US 10,797,673 B2
(45) Date of Patent: Oct. 6, 2020

(54) HIERARCHICAL CASCADING IN TWO-DIMENSIONAL FINITE ELEMENT METHOD SIMULATION OF ACOUSTIC WAVE FILTER DEVICES

(71) Applicant: RESONANT INC., Santa Barbara, CA (US)

(72) Inventors: Julius Koskela, Helsinki (FI); Viktor Plesski, Chez-le-Bart (CH)

(73) Assignee: RESONANT INC., Santa Barbara, CA (US)

(*) Notice: Subject to any disclaimer, the term of this patent is extended or adjusted under 35 U.S.C. 154(b) by 939 days.

(21) Appl. No.: 15/406,600

(22) Filed: Jan. 13, 2017

(65) Prior Publication Data

US 2018/0062604 A1  Mar. 1, 2018

Related U.S. Application Data

(60) Provisional application No. 62/380,931, filed on Aug. 29, 2016.

(51) Int. Cl.
| | |
|---|---|
| H03H 3/08 | (2006.01) |
| G06F 30/23 | (2020.01) |
| H03H 9/64 | (2006.01) |
| G06F 111/10 | (2020.01) |
| G06F 119/18 | (2020.01) |

(52) U.S. Cl.
CPC .............. H03H 3/08 (2013.01); G06F 30/23 (2020.01); H03H 9/64 (2013.01); *G06F 2111/10* (2020.01); *G06F 2119/18* (2020.01)

(58) Field of Classification Search
CPC .. H03H 3/08; H03H 9/64; G06F 30/23; G06F 2111/10; G06F 2119/18
See application file for complete search history.

(56) References Cited

U.S. PATENT DOCUMENTS 7,660,480 B1 *  2/2010  Wu ......................... G06T 17/20
                                                      345/419
7,844,421 B2 *  11/2010 Yoon ...................... G06F 30/23
                                                      703/2

(Continued)

OTHER PUBLICATIONS

PCT International Search Report for PCT/US2017/047019, Applicant: Resonant Inc., Form PCT/ISA/210 and 220, dated Dec. 1, 2017 (2pages).

(Continued)

*Primary Examiner* — Nha T Nguyen
(74) *Attorney, Agent, or Firm* — Foley & Lardner LLP

(57) ABSTRACT

A method of analyzing a microwave acoustic wave (AW) structure comprises defining a physical model of the AW structure, partitioning the physical model into a plurality of unit blocks, identifying at least one core block within the plurality of original unit blocks, computing characteristics of each of the at least one core block, deriving characteristics for each of the original unit blocks from the computed characteristics of the core block(s), combining the original unit blocks into a single block having computed characteristics derived from the characteristics of the unit blocks, such that the single block subsumes the plurality of original unit blocks, and deriving at least one electrical response of the physical model at least partially from the computed characteristics of the single block.

25 Claims, 17 Drawing Sheets

(56) References Cited

U.S. PATENT DOCUMENTS

| | | | | |
|---|---|---|---|---|
| 2006/0149513 A1* | 7/2006 | Yoon | ............ | G06F 30/23 703/2 |
| 2006/0284703 A1* | 12/2006 | Iwasaki | ............ | H03H 9/0004 333/133 |
| 2008/0172210 A1* | 7/2008 | Yoon | ............ | G06F 30/23 703/2 |
| 2008/0228452 A1* | 9/2008 | Yoon | ............ | G06F 30/23 703/2 |
| 2010/0063782 A1* | 3/2010 | Yoon | ............ | G06F 30/23 703/2 |
| 2018/0062604 A1 | 3/2018 | Koskela et al. | | |

OTHER PUBLICATIONS

PCT Written Opinion of the International Search Authority for PCT/US2017/047019, Applicant: Resonant Inc., Form PCT/ISA/237, dated Dec. 1, 2017 (8pages).

Appelo, Daniel, Absorbing Layers and Non-Reflecting Boundary Conditions for Wave Propagation Problems, Doctorial Theis, Oct. 31, 2005, pp. 1-127, XP055428285.

Becache, E. et al., Stability of perfectly matched layers, group velocities and anisotropic waves, Journal of Computational Physics 188 (2003) 399-433.

Karim, Dbich et al., Finite Element Analysis in Combination Perfectly Matched Layer to the Numerical Modeling of Acoustic Devices in Piezoelectric Material, Applied Mathematics, 2013, 4, 64-71, http://dx.doi.org/10.4236/am.2013.45A008 Published Online May 2013 (http://www.scirp.org/journal/am).

Zheng, Yibing et al., Anisotropic Perfectly Matched Layers for Elastic Waves in Cartesian and Curvilinear Coordinates, MIT Earth Resources Laboratory Industry Consortium Report, Dec. 31, 2002, pp. 1-18, XP055428293.

International Search Report and Written Opinion on PCT PCT/US2019/065784 dated Apr. 6, 2020 (16 pages).

Koskela, Julius et al: "Hierarchical Cascading Algorithm for 2-D FEM Simulation of Finite SAW Devices", IEEE Transactions on Ultrasonics, Ferroelectrics and Frequency Control, vol. 65, No. 10, Jul. 2, 2018, pp. 1933-1942, XP011690819, DOI: 10.1109/TUFFC.2018.2852603 [retrieved on Oct. 3, 2018].

Koskela, Julius et al: "Hierarchical Cascading in FEM Simulations of SAW Devices", Proceedings of the IEEE International Ultrasonic Symposium, Oct. 22, 2018 (11 pages).

MATLAB: "Cluster computing for MATLAB Users", YouTube, Apr. 28, 2017 (1 page); Retrieved from the Internet: URL: https://www.youtube.com/watch?v=6mDBrrIYpKM (retrieved Feb. 28, 2020).

* cited by examiner

HIERARCHICAL CASCADING IN TWO-DIMENSIONAL FINITE ELEMENT METHOD SIMULATION OF ACOUSTIC WAVE FILTER DEVICES

CROSS-REFERENCE TO RELATED APPLICATION(S)

This application claims priority from U.S. Provisional Patent Application Ser. No. 62/380,931 entitled "HIERARCHICAL CASCADING IN TWO-DIMENSIONAL FINITE ELEMENT METHOD SIMULATION OF ACOUSTIC WAVE FILTER DEVICES," filed Aug. 29, 2016. The content of the aforementioned patent application is hereby expressly incorporated by reference in its entirety.

FIELD OF THE INVENTION

The present inventions generally relate to microwave filters, and more particularly, to a design process for acoustic microwave filters.

BACKGROUND OF THE INVENTION

Electrical filters have long been used in the processing of electrical signals. In particular, such electrical filters are used to select desired electrical signal frequencies from an input signal by passing the desired signal frequencies, while blocking or attenuating other undesirable electrical signal frequencies. Filters may be classified in some general categories that include low-pass filters, high-pass filters, band-pass filters, and band-stop filters, indicative of the type of frequencies that are selectively passed by the filter. Further, filters can be classified by type, such as Butterworth, Chebyshev, Inverse Chebyshev, and Elliptic, indicative of the type of frequency response (frequency cutoff characteristics) the filter provides relative to the ideal frequency response.

The type of filter used often depends upon the intended use. In communications applications, band pass and band stop filters are conventionally used in cellular base stations, cell phone handsets, and other telecommunications equipment to filter out or block RF signals in all but one or more predefined bands. Of most particular importance is the frequency range from approximately 400-3,500 MHz. In the United States, there are a number of standard bands used for cellular communications. These include Band 2 (~1800-1900 MHz), Band 4 (~1700-2100 MHz), Band 5 (~800-900 MHz), Band 13 (~700-800 MHz), and Band 17 (~700-800 MHz); with other bands emerging.

Microwave filters are generally built using two circuit building blocks: resonators, which store energy very efficiently at a resonant frequency (which may be a fundamental resonant frequency $f_0$ or any one of a variety of higher order resonant frequencies $f_1$-$f_n$); and couplings, which couple electromagnetic energy between resonators and between input/output ports and resonators to create a frequency-selective spectral response with multiple reflection zeros. For example, a four-resonator filter may include four reflection zeros. The strength of a given coupling is determined by its reactance (i.e., inductance and/or capacitance). The relative strengths of the couplings determine the filter bandwidth, and the topology of the couplings determines whether the filter performs a band-pass or a band-stop function. The resonant frequency $f_0$ is largely determined by the inductance and capacitance of the respective resonator. For conventional bandpass and bandstop filter designs, the frequency at which the filter is active is determined by the resonances of the resonators that make up the filter. Each resonator must have low internal effective resistance to enable the response of the filter to be sharp and highly selective for the reasons discussed above. This requirement for low resistance tends to drive the size and cost of the resonators for a given technology.

Multiplexers, specialized types of filters with multiple input/output ports, are key components in the front-end of mobile devices. Modern mobile communications devices transmit and receive at the same time (using LTE, WCDMA or CDMA) and use the same antenna. A duplexer, which is a three-port multiplexer, is used to separate the transmit signal, which can be up to 0.5 Watt power, from the receive signal, which can be as low as a pico-Watt. The transmit and receive signals are in different frequency bands allowing the duplexer to select them. The duplexer must provide the frequency selection, isolation and low insertion loss in a very small size, often only about two square millimeters for use in a mobile device.

The front-end receive filter preferably takes the form of a sharply defined band-pass filter to eliminate various adverse effects resulting from strong interfering signals at frequencies near the received signal frequencies. Because of the direct connection of the front-end receive filter to the antenna input, the insertion loss must be very low so as to not degrade the receiver noise figure. In most filter technologies, achieving a low insertion loss requires a corresponding compromise in filter steepness or selectivity.

In practice, most filters for cell phone handsets are constructed using acoustic resonator technology, such as surface acoustic wave (SAW), bulk acoustic wave (BAW), and film bulk acoustic resonator (FBAR) technologies. The acoustic resonator has a more complicated frequency-dependent impedance than either a parallel-LC resonator or a series-LC resonator. The acoustic resonator has a frequency-dependent impedance characterized by a sharp minimum, corresponding to a series resonance, at a frequency called the "resonant" frequency and a sharp maximum, corresponding to a parallel resonance, at a higher frequency called the "anti-resonant" frequency (see K. S. Van Dyke, Piezo-Electric Resonator and its Equivalent Network Proc. IRE, Vol. 16, 1928, pp. 742-764). Such acoustic resonators have the advantages of low passband insertion loss (on the order of 1 dB at the center frequency), compact size, high unloaded Q, and low cost compared to electromagnetic inductor/capacitor resonators. For this reason, acoustic resonators are often used for microwave filtering applications in the front-end receive filter of mobile devices.

The design of modern microwave filters with acoustic resonators requires detailed models to predict the frequency response of the filter. Modern high-performance SAW devices utilize thin-film technology to optimize losses, thermal stability, electromechanical coupling, and manufacturing sensitivity. At least with respect to SAW filters, fast development of acoustic filters, which is becoming ever more complicated, demands more precise and universal simulation tools. With the parallel processing capabilities and memory available in modern personal computers (PCs), the Finite Element Method (FEM) becomes attractive for simulation of SAW structures. Compared to Finite Element Method/Boundary Element Method (FEM/BEM) hybrid methods (see M. Solal, T. Abboud, S. Ballandras, S. Chamaly, V. Laude, R. Lardat, T. Pastereaud, J. Ribbe, W. Steichen, and P. Ventura, "FEM/BEM analysis for SAW structures," Second International Symposium on Acoustic Waves Devices for Future Mobile Communication Systems, Chiba University, 2004), which does not easily address the complex structures of SAW devices, the advantage of FEM is its remarkable generality. FEM can handle arbitrary materials and crystal cuts, different electrode shapes, and different structures, including multiple metal and dielectric layers.

Traditionally, there have been two main problems in applying FEM to SAW structures: (1) the difficulty of describing open boundary conditions; and (2) the large number of degrees-of-freedom required to obtain high accuracy. These problems manifest as large memory consumption and slow computation times.

The first problem has been largely solved through the introduction of a Perfectly Matched Layer (PML) (see J. P. Berenger, "A perfectly matched layer for the absorption of electromagnetic waves", Journal of Computational Physics, 114, pp. 185-200 (1994); F. D. Hastings, J. B. Scheider, and S. L. Broschat, "Application of the perfectly matched layer (PML) absorbing boundary condition to elastic wave propagation", Journal of Acoustical Society of America, 100, pp. 3061-3069, 1996; and Y. B. Zheng and X. J. Huang, "Anisotropic perfectly matched layers for elastic waves in Cartesian and curvilinear coordinates", MIT Earth Resources Laboratory Industry Consortium Report, Massachusetts Institute of Technology, Earth Resources Laboratory, 2002).

For example, as illustrated in FIG. 1, a SAW structure 1 (which may be a filter, a resonator, a coupling element, or a portion thereof) comprising a finite array of conductive electrodes 2 (e.g., the interdigitated metal fingers of a resonator) and a semi-infinite substrate crystal 3, which may contain one or more dielectric or piezoelectric layers below, above, and between the electrodes 2, may be modeled. The SAW structure 1 may also comprise a passivation layer (e.g., $SiO_2$) 4 disposed over the electrodes 2 and substrate 3. A regional domain 6 consisting of the electrodes 2, a portion of the substrate 3 adjacent the electrodes 2, and a portion of a vacuum 5 above the electrodes 2 may be defined. The regional domain 6 may be surrounded by an artificial computational material consisting of a substrate PML 7 and a vacuum PML 8, which interfaces smoothly with the modeled domain and which has the property that incident propagating acoustic waves are converted into exponentially decaying acoustic waves. In a conventional manner, the regional domain 6, along with the substrate PML 7 and vacuum PML 8, are computationally meshed and a frequency response is computed using the FEM. This approach is unstable in some substrates with unsuitable anisotropy (see E. Becache, S. Fauqueux, and P. Joly, Stability of perfectly matched layers, group velocities and anisotropic waves, J. Comput. Phys., 188, pp. 399-433, 2003), but otherwise, using a PML is a very efficient solution to the open boundary problem (see D. Karim, S. Ballandras, T. Laroche, K. Wagner, J.-M. Brice, and X. Perios, "Finite element analysis in combination with perfectly matched layer to the numerical modeling of acoustic devices in piezoelectric materials", Applied Mathematics, vol. 4, pp. 64-71, May 2013).

Although the use of PMLs addresses the open boundary condition problem, the second problem of addressing the large number of degrees-of-freedom remains. A practical FEM model of the regions around a single electrode may contain thousands of finite elements on the order of 1000-10,000 unknown variables. Thus, the FEM model of a complete SAW structure with several hundreds of electrodes can be huge; up to millions of equations.

There, thus, remains a need to provide a more efficient and accurate technique that addresses the large number of degrees-of-freedom when modeling acoustic microwave filters, such as SAW filters.

SUMMARY OF THE INVENTION

In accordance with the present inventions, a method of analyzing a microwave acoustic wave (AW) structure (e.g., an acoustic resonator) is provided. The method comprises defining a physical model of the AW structure, partitioning the physical model into a plurality of unit blocks, and identifying at least one core block within the plurality of original unit blocks. The plurality of unit blocks may be identical to each other, in which case, only a single core block may be identified, or at least two of the plurality of unit blocks may be different from each other, in which case, at least two core blocks may be identified. The physical model of the AW structure may define a two-dimensional cross-section and an aperture of the AW structure, in which case, the physical model may be partitioned, such that each original unit block includes a portion of the two-dimensional cross-section and a portion of the aperture of the AW structure. In one embodiment, physical model of the AW structure comprises at least one electrode, a substrate layer, a vacuum layer, an absorber layer adjacent the substrate layer, and an absorber layer adjacent the vacuum layer. One of the core block(s) may contain an electrode.

The method further comprises computing characteristics (e.g., acoustic and electric fields) of each of the core block(s), and deriving characteristics for each of the original unit blocks from the computed characteristics of the core block(s). The method may further comprise identifying electrical connections to the plurality of original unit blocks, in which case, the electrical responses for each of the original unit blocks may be further derived from the identified electrical connections.

The method further comprises combining the original unit blocks into a single block having computed characteristics derived from the characteristics of the unit blocks, such that the single block subsumes the plurality of original unit blocks, and then deriving at least one electrical characteristic (e.g., a frequency response, a static capacitance, or a resonant frequency) of the physical model at least partially from the computed characteristics of the single block. The method may optionally further comprise further partitioning the physical model further into two absorber blocks that respectively terminate on the left and right sides of the single block, computing responses of each of the two absorber blocks, combining the single block and two absorber blocks into a comprehensive block having computed characteristics. The electrical characteristic(s) of the physical model can be derived at least partially from the computed characteristics of the comprehensive block.

In one embodiment, combining the original unit blocks into the single block comprises hierarchically cascading sets of adjacent unit blocks (e.g., pairs of adjacent original unit blocks) into the single block. As one example, the sets of adjacent unit blocks can be hierarchically cascaded into the single block by (a) combining sets of adjacent unit blocks at a current hierarchical level to create cascaded unit blocks at a next hierarchical level, and repeating step (a) for sets of adjacent unit blocks for the next hierarchical level until the single block is created. Each of the unit blocks is either an original unit block or a previously cascaded unit block. Any of the unit blocks that are not combined at the current hierarchical level are transferred from the current hierarchical level to the next hierarchical level. Conveniently, if one of the unit blocks has previously computed characteristics, and at least one other of the unit blocks is physically and electrically identical to the one unit block, the method may further comprise referencing the one unit block to assume the previously computed characteristics for the other unit block(s) when combining the sets of adjacent unit blocks at the current hierarchical level.

In one embodiment, the characteristics of each of the core block(s) can be computed using a Finite Element Method (FEM), e.g., by generating an A-matrix having left-side boundary DOFs, right-side boundary DOFs, and internal DOFs, and removing the internal DOFs from the A-matrix to generate a B-matrix comprising only the left-side boundary DOFs and the right-side boundary DOFs. If FEM is used to compute the core block(s), the characteristics of each of the original unit blocks may be represented by a B-matrix derived from the B-matrix(ices) of the core block(s).

If FEM is used, combining the original unit blocks may comprises identifying a first set of adjacent original unit blocks and cascading the first set of adjacent original unit blocks into a first cascaded unit block by combining the B-matrices of the respective adjacent original unit blocks of the first set into a first C-matrix having left-side boundary DOFs corresponding to the left-side boundary DOFs of a left one of the adjacent original unit blocks, right-side boundary DOFs corresponding to a right one of the adjacent original unit blocks, and internal DOFs corresponding to at least one shared edge between the adjacent original unit blocks; and reducing the first C-matrix by removing the internal DOFs from the first C-matrix to a first new cascaded B-matrix of a first cascaded unit block comprising only left-side boundary DOFs and right-side boundary DOFs.

Then, the original unit blocks can be further combined by identifying a second set of adjacent original unit blocks, and cascading the second set of adjacent original unit blocks into a second cascaded unit block by combining the B-matrices of the respective adjacent original unit blocks of the second set into a second C-matrix having left-side boundary DOFs corresponding to the left-side boundary DOFs of a left one of the adjacent original unit blocks, right-side boundary DOFs corresponding to a right one of the adjacent original unit blocks, and internal DOFs corresponding to at least one shared edge between the adjacent original unit blocks; and reducing the second C-matrix by removing the internal DOFs from the second C-matrix to a second new cascaded B-matrix of a second cascaded unit block comprising only left-side boundary DOFs and right-side boundary DOFs.

Then, the original unit blocks can be further combined by identifying the first and second cascaded unit blocks as being a set of adjacent cascaded unit blocks, and further cascading the set of adjacent cascaded unit blocks into a third cascaded unit block by combining the B-matrices of the respective adjacent cascaded unit blocks of the set of cascaded unit blocks into a third C-matrix having left-side boundary DOFs corresponding to the left-side boundary DOFs of a left one of the adjacent cascaded unit blocks, right-side boundary DOFs corresponding to a right one of the adjacent cascaded unit blocks, and internal DOFs corresponding to at least one shared edge between the adjacent cascaded unit blocks; and reducing the third C-matrix by removing the internal DOFs from the third C-matrix to a third new cascaded B-matrix of a third cascaded unit block comprising only left-side boundary DOFs and right-side boundary DOFs. This process can be repeated unit a single block subsuming all of the unit blocks is created.

A method of constructing a microwave acoustic wave (AW) filter in accordance with frequency response requirements may comprise analyzing the AW structure in accordance with the above-described method, designing an AW filter comprising the AW structure, determining a frequency response of the AW filter based on the stimulation of the AW structure, comparing the frequency response of the AW filter to the frequency response requirements, and fabricating the AW filter based on the comparison.

Other and further aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings.

Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS

Figure 1:
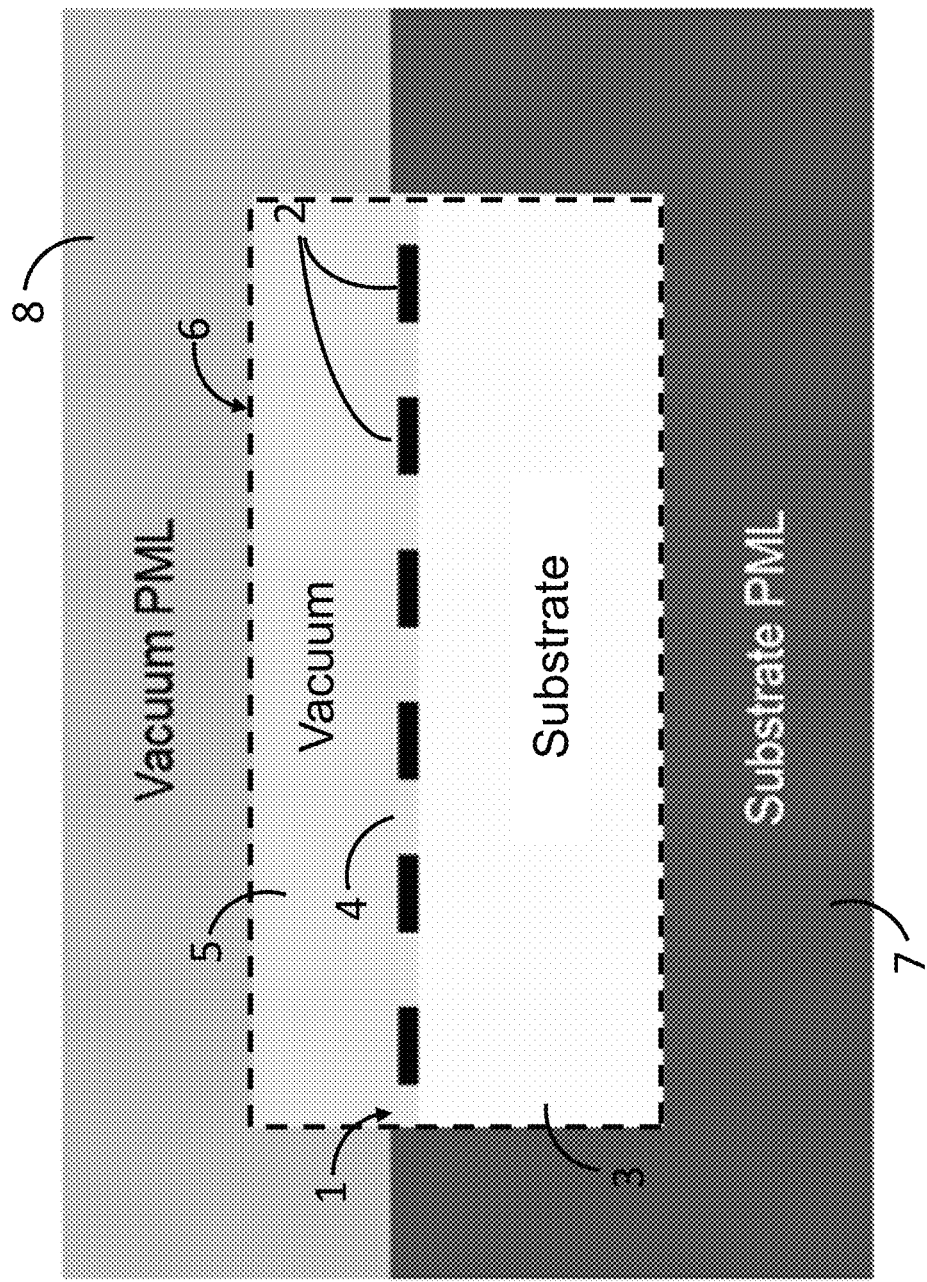
FIG. 1 is a two-dimensional (2D) cross-sectional view of a prior art physical model of a surface acoustic wave (SAW) structure.

The present disclosure describes a technique for designing acoustic wave (AW) microwave filters (such as surface acoustic wave (SAW), bulk acoustic wave (BAW), film bulk acoustic resonator (FBAR), microelectromechanical system (MEMS) filters)). This technique can be applied to AW microwave filters in the 300 MHz to 300 GHz frequency range, particularly in the 300 MHz to 10.0 GHz frequency range, and even more particularly in the 400-3500 MHz frequency range. Such AW microwave filters may be either fixed frequency and/or tunable filters (tunable in frequency and/or bandwidth and/or input impedance and/or output impedance), and may be used for single-band or multiple-band bandpass and/or bandstop filtering. Such AW microwave filters are advantageous in applications that have demanding electrical and/or environmental performance requirements and/or severe cost/size constraints, such as those found in the radio frequency (RF) front ends of mobile communications devices, including cellphones, smartphones, laptop computers, tablet computers, etc. or the RF front ends of fixed-location or fixed-path communications devices, including M2M devices, wireless base stations, satellite communications systems, etc.

Example AW microwave filters described herein exhibit a frequency response with a single passband, which is particularly useful in telecommunication system duplexers. For example, with reference to FIG. 2, a telecommunications system 10 for use in a mobile communications device may include a transceiver 12 capable of transmitting and receiving wireless signals, and a controller/processor 14 capable of controlling the functions of the transceiver 12. The transceiver 12 generally comprises a broadband antenna 16, a duplexer 18 having a transmit filter 24 and a receive filter 26, a transmitter 20 coupled to the antenna 16 via the transmit filter 24 of the duplexer 18, and a receiver 22 coupled to the antenna 16 via the receive filter 26 of the duplexer 18.

The transmitter 20 includes an upconverter 28 configured for converting a baseband signal provided by the controller/processor 14 to a radio frequency (RF) signal, a variable gain amplifier (VGA) 30 configured for amplifying the RF signal, a bandpass filter 32 configured for outputting the RF signal within an operating frequency band selected by the controller/processor 14, and a power amplifier 34 configured for amplifying the filtered RF signal, which is then provided to the antenna 16 via the transmit filter 24 of the duplexer 18.

The receiver 22 includes a notch or stopband filter 36 configured for rejecting signal interference from the RF signal input from the antenna 16 and transmitter 20 via the receiver filter 26, a low noise amplifier (LNA) 38 configured for amplifying the RF signal from the stop band filter 36 with a relatively low noise, a bandpass filter 40 configured for outputting the amplified RF signal within an operating frequency band selected by the controller/processor 14, and a downconverter 42 configured for down-converting the RF signal to a baseband signal that is provided to the controller/processor 14. Alternatively, the function of rejecting signal interference performed by the stop-band filter 36 can instead or also be performed by the duplexer 18. And/or, the power amplifier 34 of the transmitter 20 can be designed to reduce the signal interference to the receiver 22.

Figure 2:
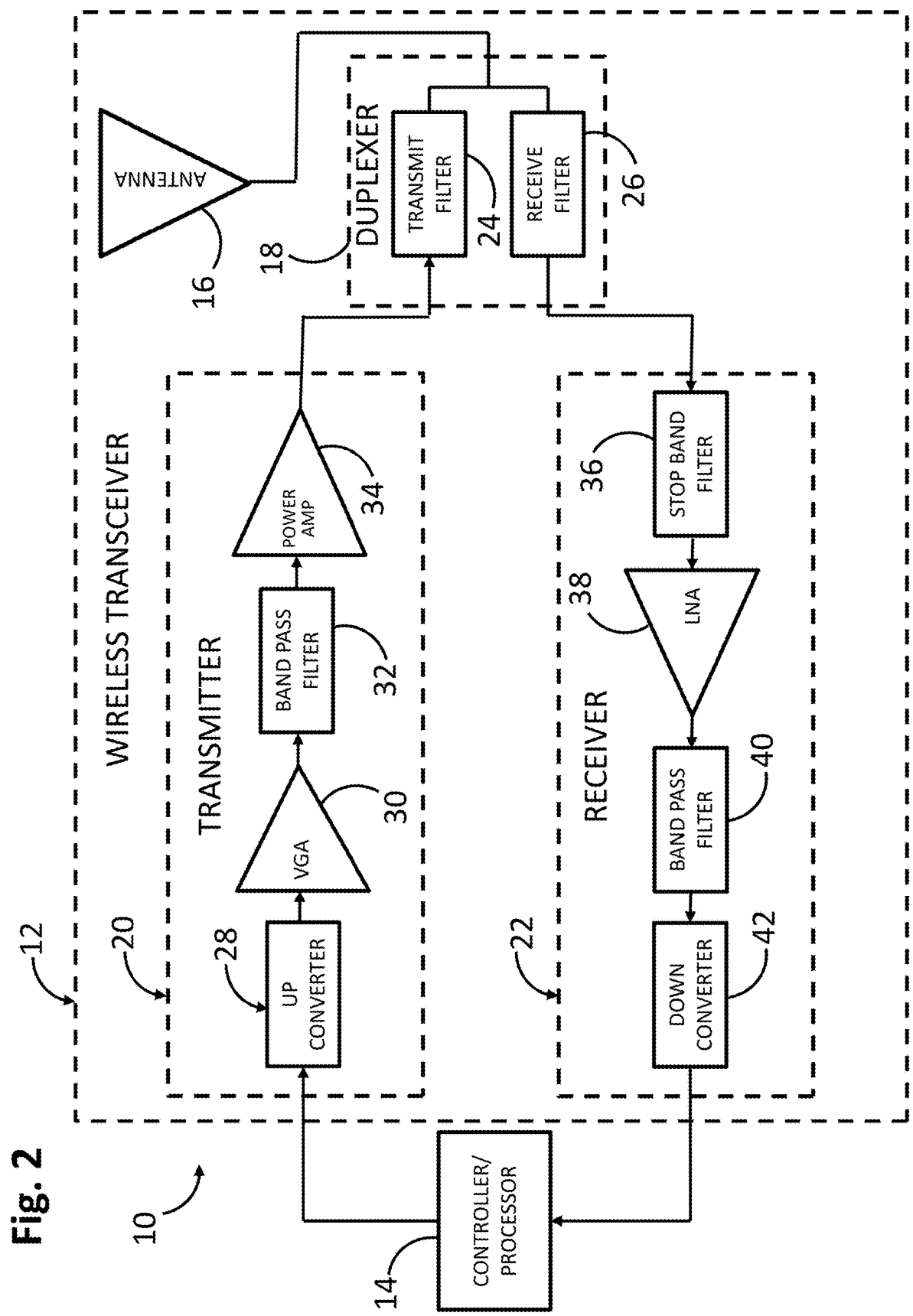
FIG. 2 is a block diagram of a wireless telecommunications system.

It should be appreciated that the block diagram illustrated in FIG. 2 is functional in nature, and that several functions can be performed by one electronic component or one function can be performed by several electronic components. For example, the functions performed by the up converter 28, VGA 30, bandpass filter 40, downconverter 42, and controller/processor 14 are oftentimes performed by a single transceiver chip or device. The function of the bandpass filter 32 can be performed by the power amplifier 34 and the transmit filter 24 of the duplexer 18.

The exemplary technique described herein is used to design acoustic microwave filters for the RF front-end, comprised of the duplexer 18, transmitter 20, and receiver 22, of the telecommunications system 10, and in particular the transmit filter 24 of the duplexer 18, although the same technique can be used to design acoustic microwave filters for the receive filter 26 of the duplexer 18 and for other RF filters in the wireless transceiver 12.

Within the context of designing acoustic microwave filters described herein, a solution that addresses the problem associated with the large number of degrees-of-freedom (DOFs) when simulating physical models of acoustic devices, such as the SAW structure 1 illustrated in FIG. 1, is described. As can be appreciated from the foregoing, it is characteristic of many SAW structures that they typically exhibit a high degree of periodicity. In particular, such SAW structures typically consist of building blocks with the same repeating electrode pattern, metallization ratio, and layer structure within each block. Due to the periodic, or block-periodic, nature of SAW structures, the FEM system of equations is highly redundant, and thus the FEM modeling effort can be limited to (a) the computationally-unique acoustic-wave-absorbing structure-terminating blocks, which are referred to herein as absorber blocks, and to (b) the physically-unique portions of the structures, which are referred to herein as core blocks.

Significantly, from the simulation/analysis point-of-view, it is sufficient to model and solve one core block representative of each unique unit block (i.e., any one of a set of physically identical unit blocks) only once for a given frequency, since the equations describing identical blocks are the same, and then use a hierarchical cascading technique to describe the SAW structure as a series of cascading operations.

The idea of the FEM hierarchical cascading technique is to describe the AW structure as a series of cascading operations. At the lowest level, the AW structure is decomposed into core blocks, which typically contain one electrode or no electrode at all. The aim is to use as few core blocks, as few absorber blocks, and as few cascading operations as possible. Achieving this aim requires analysis of the electrode structure to identify repeated patterns at different length scales. A tree presentation of the device may be constructed by dividing the structure into smaller and smaller substructures. The substructures at the lowest levels, the unit blocks, typically contain only one electrode or a gap. The less unique blocks are needed in the representation, the greater is the saving in memory consumption and computation time.

As one example illustrated in FIG. 3, the FEM hierarchical cascading technique can be applied to a synchronous resonator 50 in cross-section (shown below the dashed line). In this example, the synchronous resonator 50 comprises an interdigitated transducer (IDT) 52 consisting of thirteen electrodes 56, and a pair of reflectors (or gratings) 54a, 54b terminating the respective ends of the IDT 52 and each consisting of six electrodes 56, for a total of twenty-five electrodes 56. As the resonator 50 is synchronous, only a single core block needs to be modeled with FEM. Core blocks further differentiated by their unique voltage states will be referred to as "unit blocks." Thus, unit blocks "a," "b," and "c" refer to this single core block at three different voltages, as determined in FIG. 3 by the electrical connections of the electrodes to the horizontal bus bars "a," "b," and "c." The black boxes are original unit blocks, in this case describing a single electrode at three different electrical potentials. The white boxes are cascaded unit blocks, in this case describing multiple electrodes, obtained through cascading. And the grey boxes are already known cascaded unit blocks. The analysis of synchronous resonator 50 can be decomposed into the ten cascading operations (1-10) shown in FIG. 3, plus two additional cascading steps (not shown) to incorporate the absorber blocks.

With the foregoing in mind, the physical model of any AW structure may be partitioned into a plurality of original unit blocks, and at least one core block can be identified within the original unit blocks. Each core block will typically contain one electrode. However, electrodeless unit blocks may be needed to handle gaps and other discontinuities in the device structure. The characteristics of each of the core blocks may be computed (e.g., using FEM), the characteristics of each of the unit blocks can be derived from characteristics of the core block(s) and the electrical connections that give rise to their various voltage states, and the unit blocks can be hierarchically cascaded to progressively define cascaded (or larger) blocks at each hierarchical level until a single block subsuming all of the original unit blocks is realized. Specialized absorber blocks are typically needed at ends of the device structure, although in some cases, only one absorber block is needed or more than two absorber blocks are needed. Thus, the single all-subsuming block can be further cascaded with absorber blocks to complete the model of the AW structure. The specialized absorber blocks are described herein as PML blocks, although Green's functions may be used for the absorber blocks. In both cases, FEM can be used to model the absorber blocks.

Figure 4:
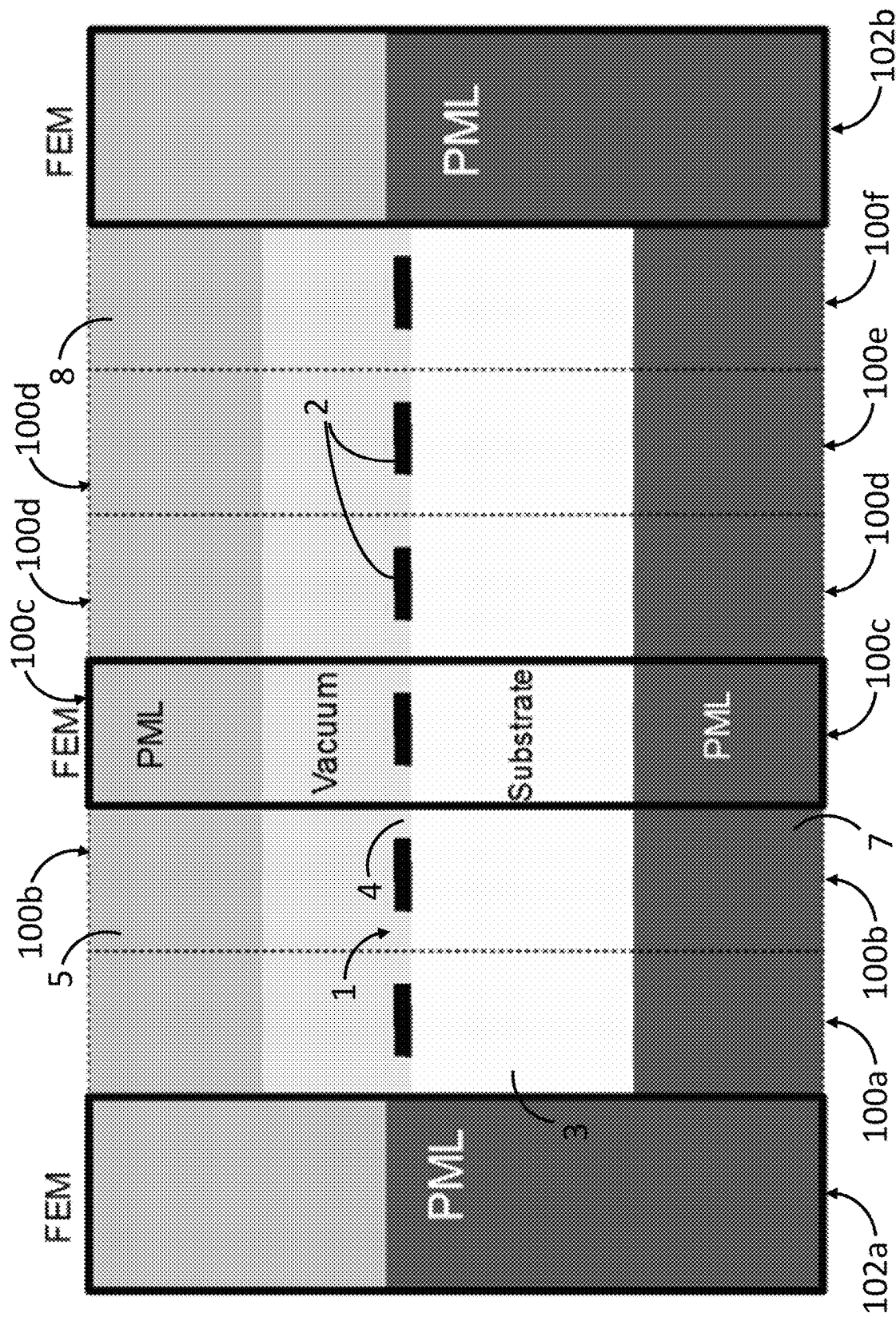
FIG. 4 is a 2D cross-sectional view of the physical model of the SAW structure of FIG. 1 partitioned into a plurality of unit blocks in accordance with the FEM hierarchical cascading technique.

As shown in FIG. 4, a physical model of an acoustic structure, such as the SAW structure 1 illustrated in FIG. 1, may be defined, and partitioned into a plurality of original unit blocks 100a-100f. The physical model defines a two-dimensional cross-section (which includes electrically-conductive electrodes 2 (in this case, six electrodes), the substrate layer 3, the passivation layer 4, the vacuum layer 5, a PML 6 adjacent the substrate layer 3, and a PML 7 adjacent the vacuum layer 5), such that each original unit block 100a-100f includes a portion of the two-dimensional cross-section of the SAW structure 1 (in this case, one electrode 2, a portion of the substrate layer 3, a portion of the passivation layer 4, a portion of the vacuum layer 5, and portions of the PMLs 6, 7) and a portion of the aperture of the SAW structure 1. In the illustrated embodiment, original unit blocks 100a-100f (each consisting of an electrode) are physically identical to each other, and thus repeatable, thereby reflecting the periodicity of the SAW structure 1. It should be appreciated that more than one electrode 2 may be included in an original unit block 100 if the periodicity of the SAW structure 1 is on the order of multiple electrodes (i.e., multiple electrodes for each period). However, for efficiency purposes, it is beneficial to limit each original block 100 to only one electrode if possible. For purposes of simplicity and brevity, only one electrode will be included in original unit blocks described herein. Two PML absorber blocks 102a, 102b (one on the left side of the SAW structure 1 and the other on the right side of the SAW structure 1) are also included.

In this case, only one core block 100, which is physically identical to, and thus representative of, all of the original unit blocks 100a-100f can be identified, modeled, and simulated using FEM to obtain the characteristics of the core block 100. The characteristics of each of the original unit blocks 100a-100f can be derived from the characteristics of the core block 100 and the electrical connections to the original unit blocks 100a-100f. The characteristics of identified sets of adjacent original unit blocks 100a-100f can be hierarchically cascaded to progressively define the characteristics for cascaded (larger) unit blocks at each hierarchical level until the characteristics for a single multi-electrode block subsuming the characteristics of all of the single-electrode original unit blocks 100a-f is realized. For example, after the core block 100 is modeled and simulated using FEM, the adjacent pair of original unit blocks 100a, 100b, the adjacent pair of original unit blocks 100c, 100d, and the adjacent pair of original unit blocks 100e, 100f can be cascaded to create three larger two-electrode cascaded unit blocks (one subsuming original unit blocks 100a-100b, another subsuming original unit blocks 100c-100d, and still another subsuming original unit blocks 100e-100f) at a first hierarchical level. Then, a first adjacent pair of these first-level two-electrode cascaded unit blocks can be cascaded to create an even larger four-electrode cascaded unit block (one subsuming original unit blocks 100a-100d) at a second hierarchical level. Then, the second-level four-electrode cascaded unit block and the remaining first-level two-electrode cascaded unit block can be cascaded to create a single six-electrode block (subsuming all original unit 100a-100f) at a third hierarchical level. In synchronous resonators consisting only of a single core electrode pattern characterized by a single period, the complexity of this hierarchical cascading increases only logarithmically with the number of electrodes. In more complicated devices, such as coupled-resonator filters (CRFs), the complexity depends on the degree of periodicity.

As discussed above, only the core blocks in the physical representation of an acoustic structure, such as a SAW structure, need be simulated with FEM. FEM may be used to simulate any core block in two dimensions (cross-section), but may take the aperture of the core block into account in the scaling of electrical currents and in the estimation of resistive losses. However, three-dimensional phenomena, such as wave guiding or bus bar radiation, may not be modelled. The FEM is preferably rigorous, based on the theory of elasticity, piezoelasticity, and Maxwell's laws in the quasi-static approximation. The result of FEM simulation of the core block is to calculate the electrical characteristics of the core block, typically the admittance matrix as a function of frequency. For simplicity, it will be assumed that the SAW structure described herein has a metal thickness that is constant and a layer structure that is regular. However, the width, the periodicity, and the electrical connection of the electrodes to bus bars may vary along the device.

Figure 5:
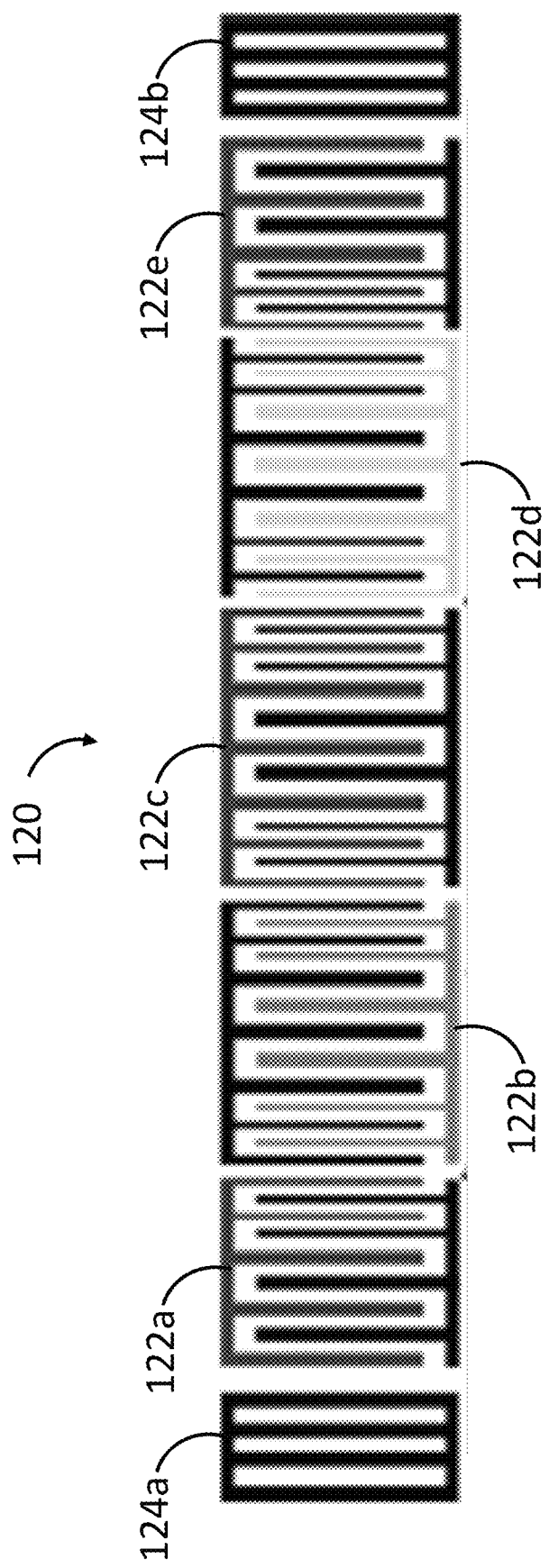
FIG. 5 is a 2D plan view of a coupled-resonator filter (CRF) simulated in accordance with a hierarchical cascading technique.
Figure 6:
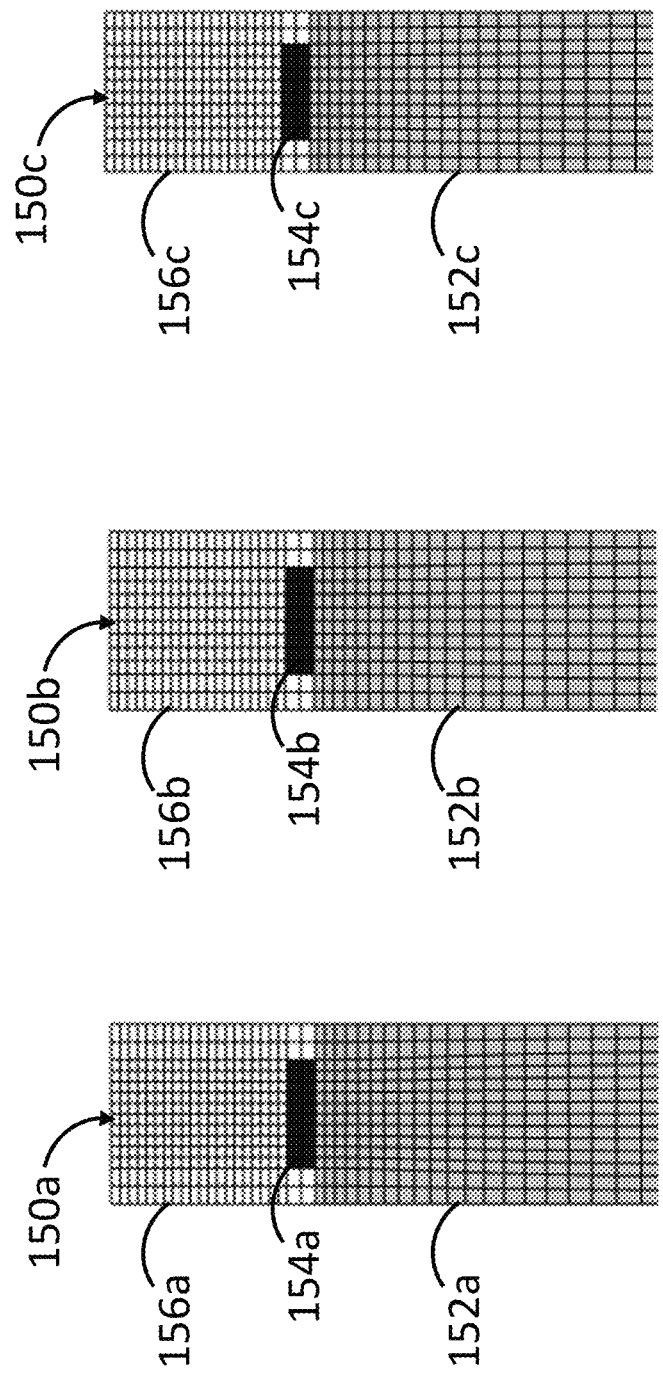
FIG. 6 are 2D cross-sectional views of three core blocks of the CRF of FIG. 5 meshed during a Finite Element Method (FEM) analysis performed in accordance with the FEM hierarchical cascading technique.

As a practical example, a coupled-resonator (CRF) design 120, illustrated in FIG. 5, comprises five interdigitated transducers (IDTs) 122*a*-122*e* and two reflectors 124*a*-124*b*, one at each end of the group of IDTs 122. The particular CRF design 120 may be reduced to just three different types of single-electrode core blocks 150*a*-150*c* (one core block 150*a* for each of the electrodes (fingers) of the IDTs 122*a*, 122*c*, and 122*d*, one core block 150*b* for each of the fingers of the IDT 122*b*, and one core block 150*c* for each of the fingers of the IDT 122*d*—each of these three core blocks representing the different electrode pitches in their respective IDTs), as illustrated in FIG. 6, as well as two absorber blocks (e.g., PML absorber blocks) (not shown in FIG. 6)—five FEM-modeled blocks in total. In the exemplary embodiment illustrated in FIG. 6, the core blocks 150*a*-150*c* have electrode pitches of 1.277, 1.263, and 1.1370, respectively, and electrode widths of 0.6822, 0.7578, and 0.7662, respectively.

As can be appreciated from FIG. 6, each core block may be meshed and simulated under harmonic electric excitation with FEM. The DOFs of each FEM model are values of acoustic fields (e.g., three-dimensional mechanical displacement) and the electric fields at the nodes of the mesh. The 2D nature of the problem corresponds to an infinitesimal length in which both resistance and currents along the electrodes are not described. While resistance is ignored in the 2D representation, the effect of resistance is re-introduced as a lumped element later as described. However, both resistance and inductance can be taken into account, as described in G. L. Matthaei, "A simplified means for computation for interconnect distributed capacitances and inductances" IEEE Trans. Comput.-Aided Design Integr. Circuits Syst., 513-524 (1992).

The core blocks 150 may be respectively taken to consist of piezoelectric substrate 152*a*, 152*b*, 152*c*, possibly covered by additional piezoelectric or dielectric layers (not shown in FIG. 6); possible metal electrodes 154*a*, 154*b*, 154*c* on the substrates 152*a*, 152*b*, 152*c*, a possible dielectric coating layer (not shown in FIG. 6), and the surrounding vacuums 156*a*, 156*b*, 156*c*. As a simplifying approximation, the substrate is assumed semi-infinite. That is, the finite thickness of the substrate 152 is not taken into account, and thus, reflections from the opposite side of the substrate 152 from where SAW devices may be located, which may otherwise give rise to "plate modes," can be ignored. The substrate, the electrodes, and the coating layer may be treated using the theory of elasticity (see D. H. Love, "A Treatise on the Mathematical Theory of Elasticity, Dover 1994; and L. D. Landau and E. M. Lifshitz, "Theory of Elasticity," Pergament Press 1986), the thermodynamical theory of piezoelectricity (see T. Ikeda, "Fundamentals of Piezoelectricity," Oxford University Press 1996), and Maxwell's equations. The treatment is two-dimensional, and the fields are assumed invariant along one coordinate axis.

With respect to the piezoelectric substrate, the theory of elasticity considers a homogeneous continuous medium. The field quantities of interest are the mechanical displacement field $\vec{u}$, the electric field $\vec{E}$, and the magnetic field $\vec{B}$. In linear, piezoelectric media, the stress tensor $\overleftrightarrow{T}$ and the electric displacement field $\vec{D}$ are linearly coupled to the strain tensor and to the electric field. Due to the low velocity of the acoustic waves in comparison to the speed of light, the magnetic field may be neglected. Consequently, the electric field may be approximated as the gradient of an electric scalar potential as follows:

$$\vec{E} = -\nabla \phi. \qquad [1]$$

Within this quasistatic approximation, the constitutive relations for the piezoelectric substrate are:

$$\begin{cases} T_{ij} = \sum_{k,l=1}^{3} c_{ijkl}^{E} \frac{\partial u_k}{\partial x_l} + \sum_{k=1}^{3} e_{kij} \frac{\partial \phi}{\partial x_k}, \\ D_i \sum_{j,k=1}^{3} e_{ijk} \frac{\partial u_j}{\partial x_k} - \sum_{k=1}^{3} \varepsilon_{ij}^{S} \frac{\partial \phi}{\partial x_j}. \end{cases} \qquad [2]$$

Figure 7:
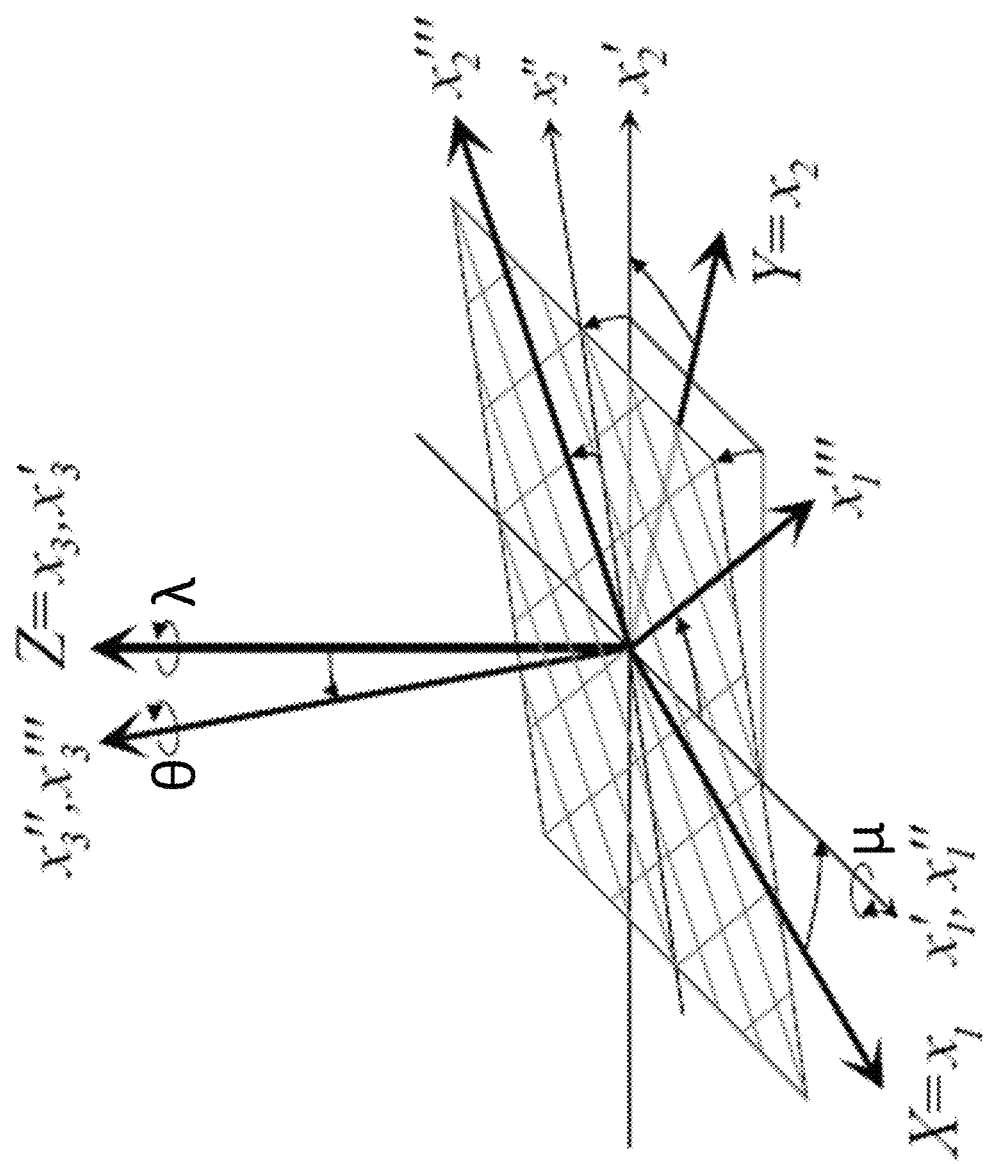
FIG. 7 is a perspective view of Euler angles in a coordinate system.

Here, $T_{ij}$ are components of the second-rank stress tensor, $c_{ijkl}^{E}$ are the components of the fourth rank stiffness tensor, $e_{kij}$ are the components of the third-rank piezoelectric tensor, and $\varepsilon_{ij}^{S}$ are the components of the second rank permittivity tensor. The components of the stiffness tensor, piezoelectric tensor, and permittivity tensor are materials parameters. The superscripts E and S indicate that the components of the tensors are to be measured under constant electric field and under constant strain, respectively. Piezoelectric materials are strongly anisotropic, and the crystal cut and the device orientation must be defined. These are commonly specified through Euler angles, as illustrated in FIG. 7.

The first rotation $\lambda$ about the crystal Z-axis ($x_3$-axis) and the second rotation $\mu$ about the $x'_1$-axis determine the surface plane (the wafer cut, shown here as a cross-hatched rectangle). The third rotation $\theta$ about the $x''_3$-axis specifies the device orientation (the primary SAW propagation direction on the wafer). It should be noted there is no generally agreed way to define Euler angles. The choice depends on the field of engineering and personal taste.

In each homogeneous subdomain, the governing equations are the equation of motion:

$$\rho \frac{\partial^2 u_i}{\partial t^2} = \sum_{j=1}^{3} \frac{\partial T_{ij}}{\partial x_j}, \qquad [3]$$

and Maxwell's equation:

$$\nabla \cdot \vec{D} = 0. \qquad [4]$$

With respect to dielectric films, the same equations apply as for piezoelectric substrates, except that the components of the piezoelectric tensor vanish. The anisotropy and material parameters of thin films may depend on the manufacturing process. Often, they are just assumed isotropic. Monocrystalline and textured films also exist and can be modeled within the framework of this invention, as well.

With respect to metal electrodes, the constitutive relation between stresses and mechanical displacement is similar to piezoelectric substrates. Polycrystalline electrodes are macroscopically isotropic. There is no piezoelectric coupling, and, ignoring resistivity, the electric potential is constant over the electrode.

The mechanical displacement vanishes in vacuum. The electric displacement field is given by:

$\vec{D} = \varepsilon_0 \vec{E}$, where $\varepsilon_0$ is the permittivity of vacuum, and Maxwell's equation reduces to: [5]

$$\nabla^2 \phi = 0. \quad [6]$$

The mechanical displacement field and the normal component of the stress tensor are continuous across interfaces, and vanish in vacuum. The electric potential is continuous everywhere and constant over each electrode. The normal component of the electric displacement is continuous across non-metallic (substrate-vacuum, substrate-dielectric, dielectric-vacuum) interfaces. At metallic interfaces, surface charge may occur, giving rise to electric current:

$$I = -\frac{\partial}{\partial t} \int_A d\vec{n} \cdot \vec{D}. \quad [7]$$

Here, the integrand is evaluated over the non-metallic side of the interface. These continuity conditions, including the integration of surface changes, are automatically taken into account by the chosen FEM formulation.

As previously discussed, the open boundaries may be approximated with PML (see J. P. Berenger, "A Perfectly Matched Layer for the Absorption of Electromagnetic Waves," Journal of Computational Physics, 114, 185-200, 1994), which is a synthetic computational material that has the surface impedance of the real material, but which absorbs all radiation entering the layer.

However, because the generalization of PMLs for acoustic and piezoelectric problems proved more problematic, a breakthrough occurred with the introduction of convolution perfectly matched layers (C-PML) (see F. D. Hastings, J. B. Scheider, and S. L. Broschat, "Application of the Perfectly Matched Layer (PML) Absorbing Boundary Condition to Elastic Wave Propagation," Journal of Acoustical Society of America, 100, 3061-3069, 1996; W. C. Chew and Q. H. Liu, "Perfectly Matched layers for Elastodynamics: A New Absorbing Boundary Condition," Journal of Computational Acoustics, 4, 341-359, 1996; Y. B. Zheng and X. J. Huang, "Anisotropic Perfectly Matched Layers for Elastic Waves in Cartesian and Curvilinear Coordinates," MIT Earth Resources Laboratory Industry Consortium Report, Massachusetts Institute of Technology, Earth Resources Laboratory, 2002). This approach is suitable for easy implementation even on commercial FEM platform, such as COMSOL, and it is applicable in both time-domain and frequency-domain simulations (see O. Bou Matar, E. Galopin, Y. Li, and O. Ducloux, "An Optimized Convolution-Perfectly Matched Layer (C-PML), Absorbing Boundary Condition for the Second-Order Elastic Wave Equation—Application to Surface and Lamb Waves Propagation," Proceedings of the COMSOL Users Conference 2007, 2007). Applications of the method have been shown even in professional SAW device modeling (see D. Karim, S. Ballandras, T. Laroche, K. Wagner, J.-M. Brice, and X. Perois, "Finite Element Analysis in Combination with Perfectly Matched Layer to the Numerical Modeling of Acoustic Devices in Piezoelectric Materials," Applied Mathematics, 4, 64-71, 2013).

Within the PML, the physical coordinates $\{x_1, x_3\}$ are replaced with complex-value quantities of the form:

$$\begin{cases} \tilde{x}_1 = x_1 + i \int \sigma_1(x_1) dx_1, \\ \tilde{x}_3 = x_3 + i \int \sigma_3(x_3) dx_3. \end{cases} \quad [8]$$

This operation is known as complex coordinate stretching. For more generality, the stretching factors $\sigma_i$ may be complex-valued and frequency-dependent. In time-domain analysis, they are subject to additional restrictions arising from causality. Stretching is only applied in the direction, where absorption is required. For the sake of clarity, let us fix the coordinates in such way that the substrate fulfills the halfspace $x_3 \leq 0$, vacuum lies in the positive direction $x_3 \to \infty$, and $x_1$-direction is parallel to the substrate surface. Consider the effect of coordinate stretching on a bulk wave propagating into the substrate:

$$\exp(ik_3 x_3) \to \exp(ik_3 \tilde{x}_3) = \exp(ik_3 x_3) \exp(-k_3 \int \sigma_3(x_3) dx_3). \quad [9]$$

With $\sigma_3 < 0$, the wave vanishes with $x_3 \to -\infty$. This is the purpose of the coordinate stretching: to convert propagating waves into decaying waves. With appropriately chosen stretching factors and a sufficiently deep PML, essentially all of the energy incident into the layer will be absorbed. The stretching factors should be chosen with care. To avoid disturbing the solution within the normal substrate, the stretching should be smooth, and should vanish at the boundary between the substrate and the PML. At least a quadratic profile is recommended at the boundary. At the same time, sufficient decay should be reached within the depth of the layer. Preferably, the parameters of the C-PML are optimized in this approach.

C-PML is ill-suited for the vacuum. Since the solution of Maxwell's equation in vacuum is static, there are no propagating waves, and hence coordinate stretching does not result in attenuation. However, one approach that is both easy to implement and extremely efficient introduces a strong artificial anisotropy to the vacuum as follows (see I. Bardi, O. Biro, and K. Preis, "Perfectly Matched Layers in Static Fields," IEEE Transactions on Magnetics," Vol. 34, 2433-2436, 1998):

$$\varepsilon_0 \to \varepsilon_0 \begin{bmatrix} q(x_3) & 0 \\ 0 & q^{-1}(x_3) \end{bmatrix}. \quad [10]$$

Here, $q(x_3)$ is a parameter. To avoid numerical problems, it starts from $q=1$, but increases rapidly deeper into the PML, in such manner that the component of the permittivity tensor along the normal direction is (much) less than one.

Figure 8:
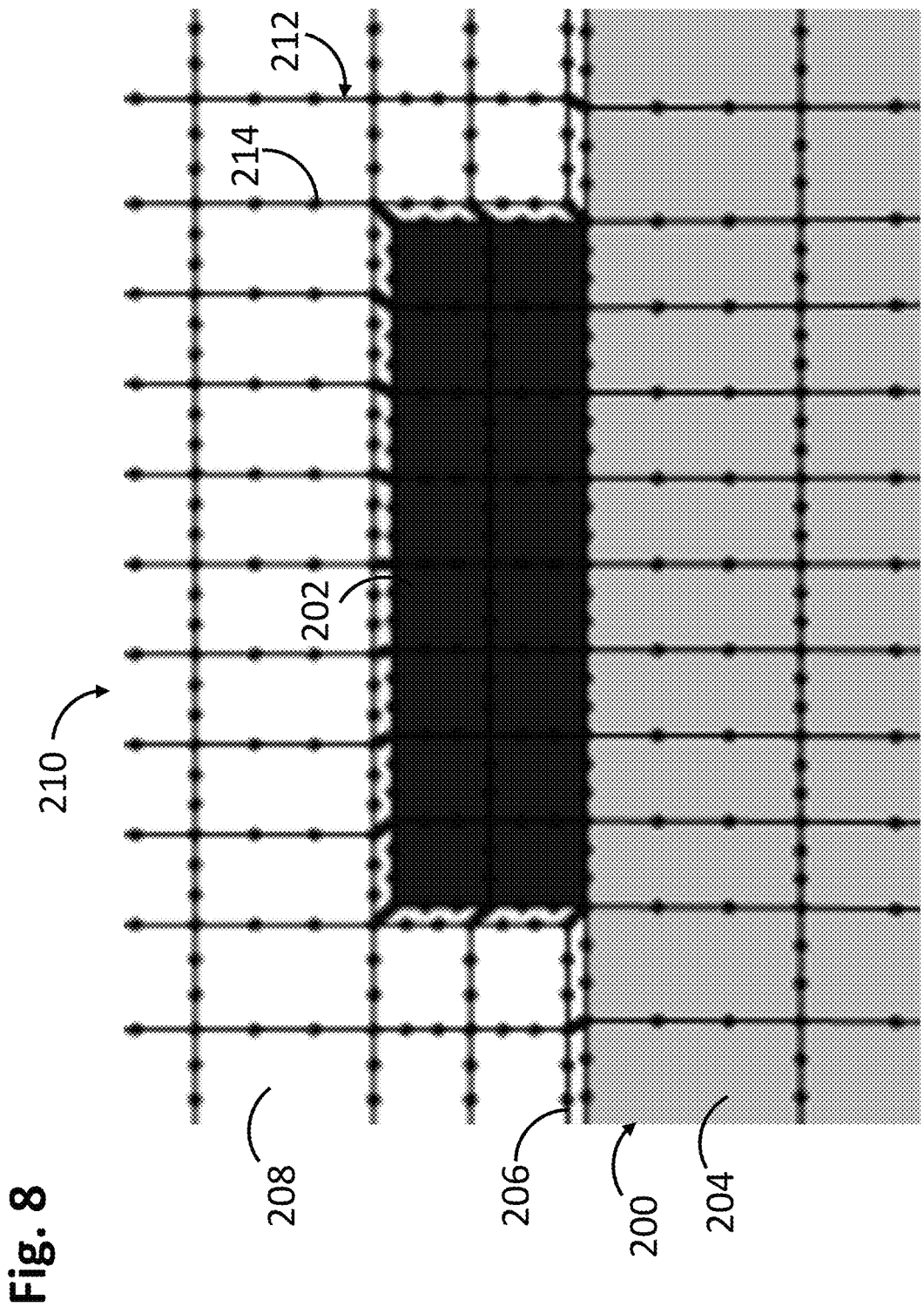
FIG. 8 is a 2D cross-sectional view of a physical model of a portion of a SAW structure, containing an electrode, that has been meshed during an FEM analysis performed in accordance with hierarchical cascading technique.

Referring to FIG. 8, the foregoing equations can be used to apply FEM to a portion of a SAW structure 200 comprising a single conductive electrode 202, substrate crystal 204, passivation layer 206, and vacuum 208. To model and solve the problem with FEM, the simulated domain 210 is subdivided (meshed) into a set of finite elements 212 and node points 214. The most commonly used elements have triangular or quadrilateral shape. Lowest-order elements (linear elements) have a node point at each corner of the elements. Higher-order elements have additional nodes on the boundary or in the interior of the elements. In the illustrated case, each of the finite elements 212 takes the form of a fourth-order quadrilateral, although other order elements, such as third-order triangular elements, could be used.

The implementation and use of FEM is well-known and conventional, for the discussion herein, it is sufficient to know that a shape function is related to each node point 214. The fundamental fields of interest are expressed as a linear combination of the shape functions. The values of the fields at the node points 214 become the variables to be solved, degrees-of-freedom (DOFs) of the model. We choose as fundamental variables the mechanical displacement field $\vec{u}$ and the scalar potential $\phi$. They take the form:

$$\begin{cases} \vec{u}(x_1, x_3) = \sum_{n \in nodes} N^n(x_1, x_3) \vec{u}_n, \\ \phi(x_1, x_3) = \sum_{n \in nodes} N^n(x_1, x_3) \phi_n. \end{cases} \quad [11]$$

Here, the summation goes over all nodes, $N^n(x_1, x_3)$ denotes the shape function belonging to node n, and the values of the fields at the node points, $\{\vec{u}_n, \phi_n\}$, become the DOFs to be solved. Due to the construction of the shape functions, the mechanical displacement and the electric potential are continuous everywhere in the simulation domain. On electrodes, the electrical potential (voltage) is set to a constant.

To solve the problem, the expressions above are substituted to the constitutive relations and the governing equations. The equations are discretized by multiplying them with each shape function and by integrating over the whole simulation domain. As the result, one obtains a linear system of equations of the form:

$$[K - \omega^2 M](x) = (s). \quad [12]$$

Here, the matrices K and M are known as the stiffness matrix and the mass matrix; together they form the system matrix. $\omega$ denotes angular frequency, vector x collects all degrees of freedom to be solved, and the vector s is known as the source vector. Typically, the only nonzero elements of the source vector represent charge densities on metal surfaces.

The exact form of the system matrix is not relevant here. However, it is beneficial to know that it is symmetric, and that the elements of the mass matrix consist of integrals over the shape functions:

$$M^{nm} \sim \int \rho N^n N^m dA. \quad [13]$$

The elements of the stiffness matrix are composed of integrals of the form:

$$D_{\mu\nu}^{nm} = \int \frac{\partial N^n}{\partial x_\mu} \frac{\partial N^m}{\partial x_\nu} dA. \quad [14]$$

Figure 9:
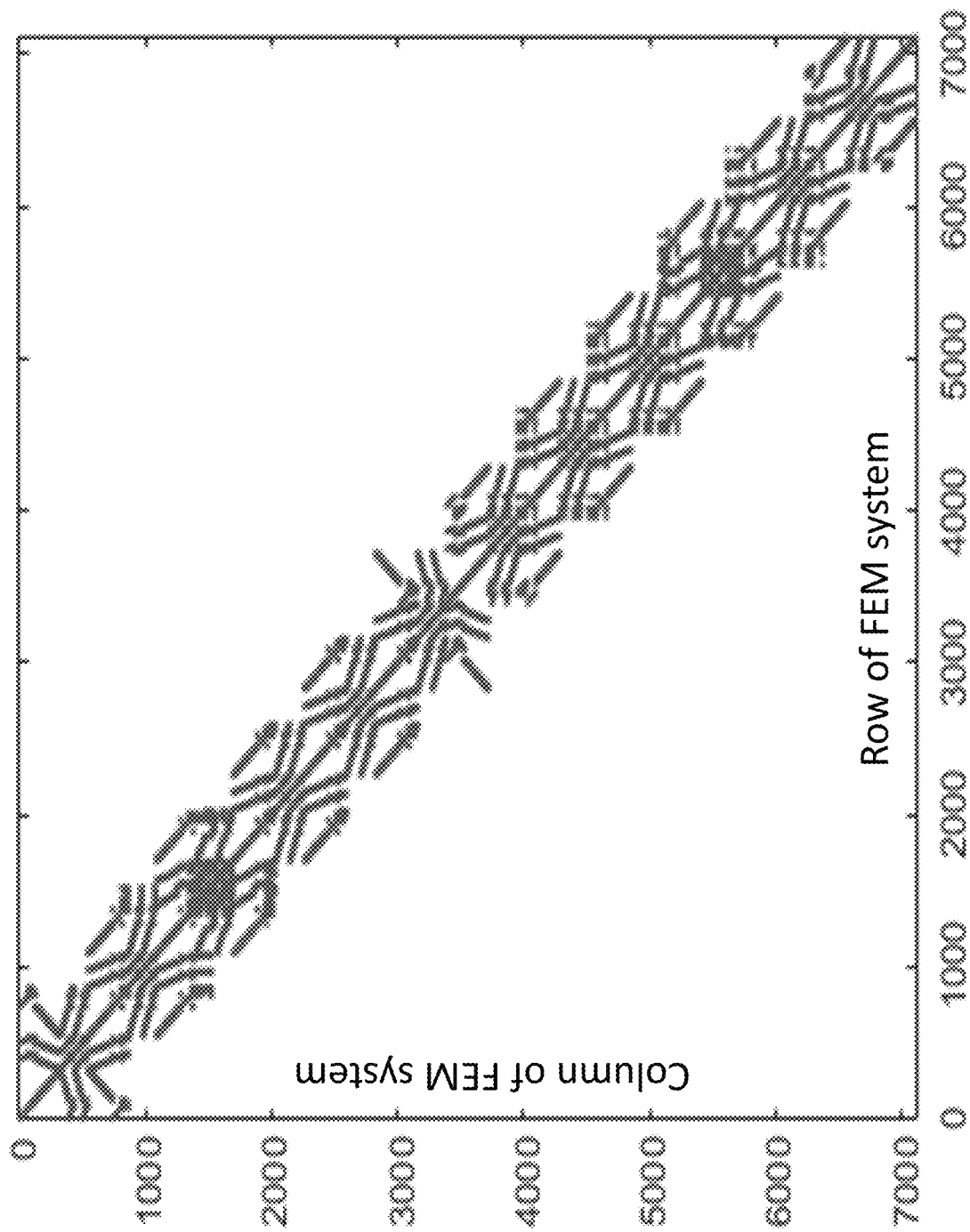
FIG. 9 is a diagram a sparsity plot of an FEM system matrix of the physical model of the SAW structure of FIG. 8.

Only DOFs located in adjacent elements are coupled. In an FEM problem of any considerable size, an overwhelming majority of the system matrix elements is zero, as shown by the sparsity pattern illustrated in FIG. 9. This particular model consists of 520 elements, 2766 nodes, and 7113 DOFs. The system matrix has 490,215 non-zero entries. 99.0% of the matrix elements are zero. In principle, the ordering of the variables within the system matrix is arbitrary. In practice, orderings of the variables that minimize the bandwidth of the system matrix, which is an indication of how coupled the matrix is, are preferable. As illustrated in FIG. 9, the bandwidth of the system matrix elements is relatively narrow.

An easy way to incorporate losses in the model is to add a small, material-dependent imaginary component to the stiffness coefficients. As a result, the stiffness matrix is split into two components:

$$K \rightarrow K + i\omega Q. \quad [15]$$

With respect to the implementation of C-PML, the stretching factors enter the formulation via the elements of the stiffness matrix. Equation [14] may take the form:

$$D_{\mu\nu}^{nm} \rightarrow \int \left(\frac{1}{1 + i\sigma_\mu}\right)\left(\frac{1}{1 + i\sigma_\nu}\right) \frac{\partial N^n}{\partial x_\mu} \frac{\partial N^m}{\partial x_\nu} dA, \quad [16]$$

where entries to the system matrix and source vector are normalized with the product $(1+i\sigma_1)(1+i\sigma_3)$.

Figure 10A:
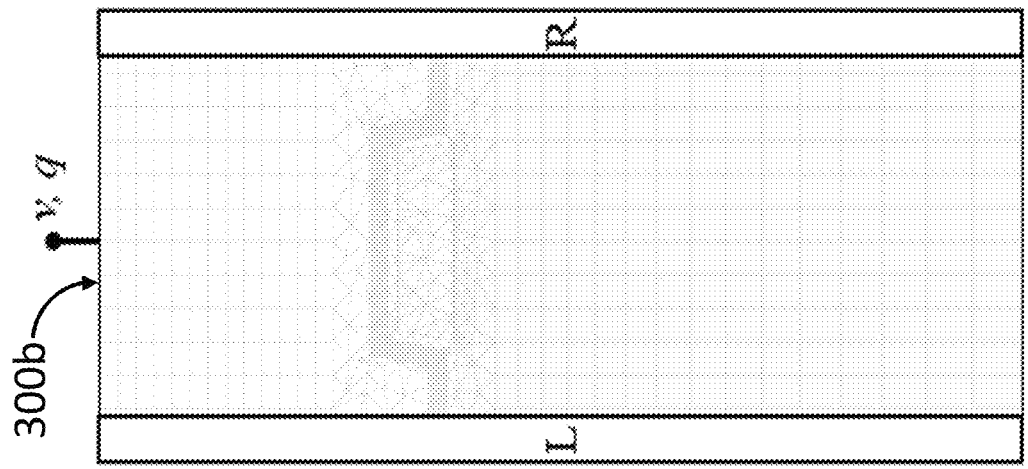
FIGS. 10a and 10b are 2D cross-sectional views illustrating the transformation of a fully meshed core block having internal degrees-of-freedom (DOF) to a core block with no internal DOFs, a single electrode node with voltage v and net surface charge q, and multiple DOFs on the L and R sets of boundary nodes.
Figure 10B:
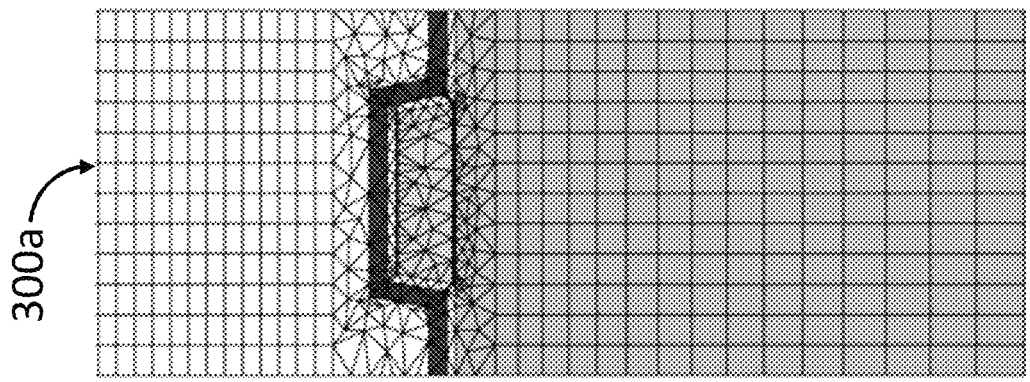

Significantly, cascading of unit blocks can be facilitated by removing internal degrees of freedom (in this case, the acoustic and electric fields) from the unit blocks. In particular, each unit block may be modeled in isolation, with interaction between different unit blocks occurring only through the side walls and the electric boundary conditions. Each unique block, i.e., a core block, may be meshed and modeled with FEM, thereby transforming the block into an FEM model 300a (FIG. 10a). FEM yields a full linear system of equations, which couples the degrees-of-freedom (DOFs) within the core block: the components of mechanical displacement and electric potential, at the node points of the mesh. There are three types of nodes: those located at the left edge of the FEM model 300a, the right edge of the FEM model 300a, and in the interior of the FEM model 300a. For compatibility with the cascading approach described herein, the mesh structure at the boundary between consecutive unit blocks must be identical. By eliminating the internal DOFs (e.g. by computing the Schur complement or via Kron reduction), the FEM model 300a may be converted into a network 300b, where the electric connection to the electrode and the DOFs located at the left boundary (L) and the right boundary (R) serve as "ports" having electric potentials and forces as inputs (FIG. 10b).

In particular, consider the FEM system matrix of a representative core block, with nodes and corresponding DOFs that can be sorted into those corresponding to left edge, interior, and right edge. Thus, for harmonic excitation at a single frequency, the FEM model 300a of FIG. 9a may yield a linear system of equations that can be expressed as follows:

$$A \begin{pmatrix} x_L \\ x_I \\ x_R \\ v \end{pmatrix} = \begin{bmatrix} A_{LL} & A_{LI} & 0 & A_{LV} \\ A_{IL} & A_{II} & A_{IR} & A_{IV} \\ 0 & A_{RI} & A_{RR} & A_{RV} \\ A_{VL} & A_{VI} & A_{VR} & A_{VV} \end{bmatrix} \begin{pmatrix} x_L \\ x_I \\ x_R \\ v \end{pmatrix} = \begin{pmatrix} 0 \\ 0 \\ 0 \\ -q \end{pmatrix}, \quad [17]$$

where the entries $A_{jk}$ are matrix components, the vectors $(x_L, x_I, x_R)$ contain the nodal DOFs respectively located at the left edge, interior, and right edge of the core block, the scalar v is the electric potential connected to the electrode (if an electrode is present in the core block) and q is the net surface charge at the (possible) electrode boundary. If multiple electrodes are present in the core block), the scalars v and q can be extended to vectors.

The FEM model of each representative core block is cast into the form of a reduced-coefficient boundary matrix (B-matrix), which describes the relations between the fields at these interfaces, by eliminating the internal DOFs from the FEM matrix system, resulting in a B-matrix where the only DOFs are the electrode potential and charge (if an electrode is present) and the field values at the left- and right-hand side interface nodes, as follows:

$$x_I = -A_{II}^{-1}[A_{IL} \quad A_{IR} \quad A_{IV}]\begin{pmatrix} x_L \\ x_R \\ v \end{pmatrix} \quad [18]$$

results in a reduced matrix equation:

$$\left(\begin{bmatrix} A_{LL} & 0 & A_{LV} \\ 0 & A_{RR} & A_{RV} \\ A_{VL} & A_{VR} & A_{VV} \end{bmatrix} - \begin{bmatrix} A_{LI} \\ A_{RI} \\ A_{VI} \end{bmatrix} A_{II}^{-1}[A_{IL} \quad A_{IR} \quad A_{IV}]\right)\begin{pmatrix} x_L \\ x_R \\ v \end{pmatrix} = \begin{pmatrix} 0 \\ 0 \\ -q \end{pmatrix}. \quad [19]$$

Interpreting the left and right edges as interfaces, we identify the coefficient matrix as the boundary matrix (B-matrix):

$$B\begin{pmatrix} x_L \\ x_R \\ v \end{pmatrix} = \begin{bmatrix} B_{11} & B_{12} & B_{13} \\ B_{21} & B_{22} & B_{23} \\ B_{31} & B_{32} & B_{33} \end{bmatrix}\begin{pmatrix} x_L \\ x_R \\ v \end{pmatrix} = \begin{pmatrix} 0 \\ 0 \\ -q \end{pmatrix}. \quad [20]$$

The FEM system matrix A in equation [17] and as exemplified in FIG. 9 is inherently symmetric and very sparse, whereas the coefficient matrix B in equation [20] is also symmetric, but not sparse. It is therefore sufficient to only store the upper triangular or the lower triangular portions of the A- and B-matrices. The B-matrix shares some similarity with admittance matrices (Y) of network theory, as well as with system matrices obtained with the boundary element method. Electrical current flowing into the electrode can be expressed as:

$$I = i\omega W q = -i\omega W[B_{31} \quad B_{32} \quad B_{33}]\begin{pmatrix} x_L \\ x_R \\ v \end{pmatrix}, \quad [21]$$

where W denotes the acoustic aperture.

Resistive losses in a single electrode are modeled as a lumped series resistor R connected electrically between the electrode and the bus bar. The effect can be subsumed into the B-matrix, as follows:

$$B \rightarrow \begin{bmatrix} B_{11} + \dfrac{i\omega W R B_{13} B_{31}}{1 - i\omega W R B_{33}} & B_{12} + \dfrac{i\omega W R B_{13} B_{32}}{1 - i\omega W R B_{33}} & \dfrac{B_{13}}{1 - i\omega W R P_{33}} \\ B_{21} + \dfrac{i\omega W R B_{23} B_{31}}{1 - i\omega W R B_{33}} & B_{22} + \dfrac{i\omega W R B_{23} B_{32}}{1 - i\omega W R B_{33}} & \dfrac{B_{23}}{1 - i\omega W R P_{33}} \\ \dfrac{B_{31}}{1 - i\omega W R P_{33}} & \dfrac{B_{32}}{1 - i\omega W R P_{33}} & \dfrac{B_{33}}{1 - i\omega W R P_{33}} \end{bmatrix}. \quad [22]$$

The resulting B-matrix remains symmetric.

A SAW structure must have at least two electric connections, one of which must be defined as the ground (reference), and the rest of which are considered electric ports. Thus, an electrode can be either connected to the ground, to one of the electric ports, or it can be left floating. To simulate the SAW structure, one electric port may be excited by applying a unity voltage between the port and the ground, while keeping all other electric ports grounded. Each electric port is excited in turn and, for each excitation, the currents flowing in every electric port are collected. Thus, the electric state of each electrode must be specified. For device modeling, an extended B-matrix that covers all electric ports, and that connects each electrode to the correct potential is needed. To this end, the electric potentials of all the electric connections are collected into the vector $V \equiv (v_1 \ldots v_K)^T$, and the vector $Q \equiv (q_1 \ldots q_K)^T$ containing the corresponding net surface charges is defined. Defining a connectivity vector $\Gamma$ as a K×1 vector:

$$\Gamma_k = \begin{cases} 1, & \text{electrode} \in \text{connection } k, \\ 0, & \text{otherwise,} \end{cases}$$

leads to the symmetric, extended B-matrix of a unit block:

$$B^E\begin{pmatrix} x_L \\ x_R \\ V \end{pmatrix} = \begin{bmatrix} B_{11}^E & B_{12}^E & B_{13}^E \\ B_{21}^E & B_{22}^E & B_{23}^E \\ B_{31}^E & B_{32}^E & B_{33}^E \end{bmatrix}\begin{pmatrix} x_L \\ x_R \\ V \end{pmatrix} = \quad [24]$$

$$\begin{bmatrix} B_{11} & B_{12} & B_{13}\Gamma^T \\ B_{21} & B_{22} & B_{23}\Gamma^T \\ \Gamma B_{31} & \Gamma B_{32} & \Gamma B_{33}\Gamma^T \end{bmatrix}\begin{pmatrix} x_L \\ x_R \\ V \end{pmatrix} = \begin{pmatrix} 0 \\ 0 \\ -Q \end{pmatrix}.$$

Figure 11A:
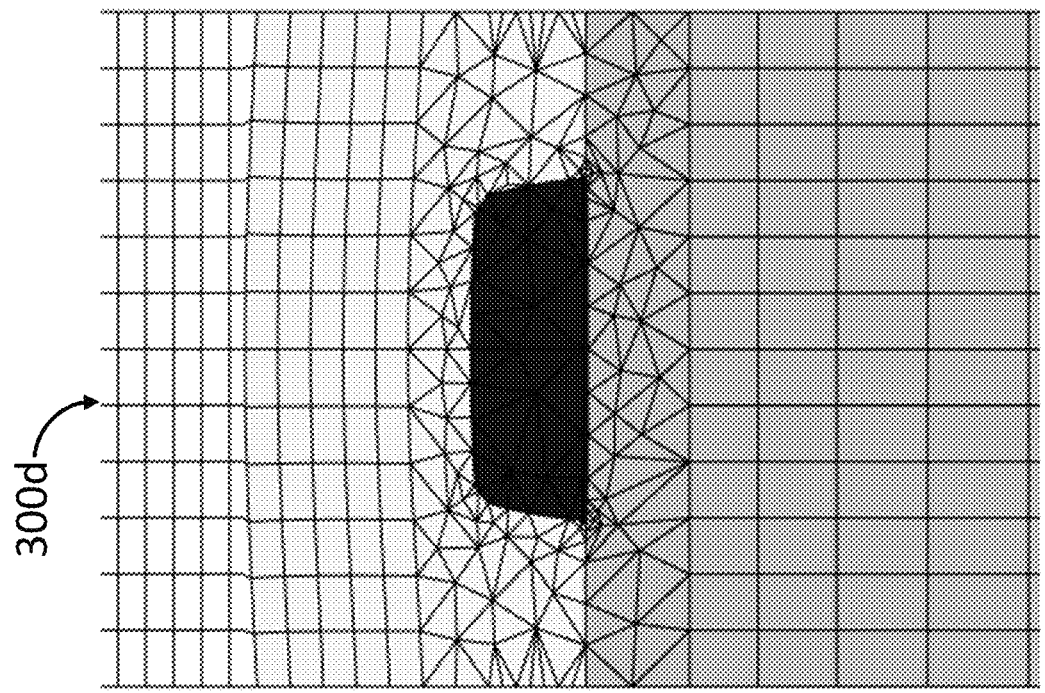
FIGS. 11a and 11b are 2D cross-sectional views illustrating a fully meshed core block with local deformation due to thermal compression and thermal expansion.
Figure 11B:
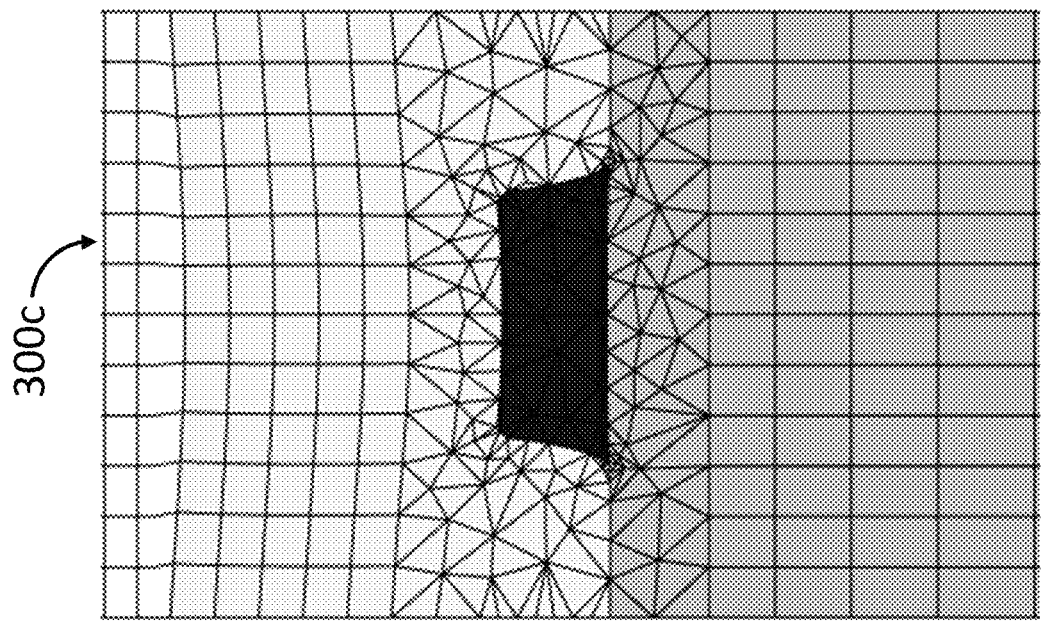

It should be noted that temperature changes affect the frequency response of a SAW device through changes in materials parameters, especially SAW velocity, and through thermal expansion, which deforms the device geometry. FEM is well-suited to modeling both mechanisms. Such thermal effects may be taken into account by the FEM when modeling the core block, such that local deformation in the core block due to the thermal effects is represented in the FEM model. For example, assuming a temperature change of ±1° C., a local deformation of a FEM model 300c under thermal compression and an FEM model 300d under thermal expansion occurs as respectively shown in FIGS. 11a and 11b, with the local deformation being exaggerated 100-fold for illustration purposes. To remain compatible with the hierarchical cascading principle, the restriction needs to be made that identical unit blocks are only allowed to expand identically. This excludes effects such as warping of the device, where the deformation varies across the device. The substrate crystal is allowed to expand freely. The planar dimensions of the unit blocks are assumed to follow the substrate crystal. Local deformation inside each unit block is modeled with thermal FEM analysis. The obtained deformed meshes are then used as meshes in the electric simulation.

When cascading the characteristics of unit blocks derived from computed characteristics of the core block, the DOFs on the sides of each unit block mesh and the electric potential and net surface charge on the electrode(s) (if any) are treated as interfaces. In particular, the extended B-matrices describing two adjacent unit blocks can be cascaded to obtain a combined B-matrix, which then describes both blocks. In the combined B-matrix, the left edge of the first unit block and the right edge of the second unit block become the new interfaces, and the shared edge in the middle is eliminated. The process can be continued until the whole device is covered. In this way, the huge, unmanageable modelling problem can be decomposed into smaller, manageable sub-problems.

For example, consider two extended or combined B-matrices $B^A$ and $B^B$, characterizing two adjacent unit blocks; for example, two adjacent unit blocks respectively containing two electrodes. As discussed above, the meshes of the adjacent unit blocks must be compatible at the shared interface $B^A \cap B^B$. With $x_L$ denoting the DOFs on the left edge of unit block $B^A$, $x_R$ denoting the DOFs on the right edge of unit block $B^B$, and $x_C$ denoting the DOFs on the shared edge between unit blocks $B^A$ and $B^B$, their combined system matrix, $C^{AB}$, takes the form:

$$C^{AB}\begin{pmatrix} x_L \\ x_C \\ x_R \\ V \end{pmatrix} = \begin{bmatrix} C^{AB}_{LL} & C^{AB}_{LC} & 0 & C^{AB}_{LV} \\ C^{AB}_{CL} & C^{AB}_{CC} & C^{AB}_{CR} & C^{AB}_{CV} \\ 0 & C^{AB}_{RC} & C^{AB}_{RR} & C^{AB}_{RV} \\ C^{AB}_{VL} & C^{AB}_{VC} & C^{AB}_{VR} & C^{AB}_{VV} \end{bmatrix} \begin{pmatrix} x_L \\ x_C \\ x_R \\ v \end{pmatrix} = \quad [25]$$

$$\begin{bmatrix} B^A_{11} & B^A_{12} & 0 & B^A_{13} \\ B^A_{21} & B^A_{22}+B^B_{11} & B^B_{12} & B^A_{23}+B^B_{13} \\ 0 & B^B_{21} & B^B_{22} & B^B_{23} \\ B^A_{31} & B^A_{32}+B^B_{31} & B^B_{32} & B^A_{33}+B^B_{33} \end{bmatrix} \begin{pmatrix} x_L \\ x_C \\ x_R \\ V \end{pmatrix} = \begin{pmatrix} 0 \\ 0 \\ 0 \\ -Q \end{pmatrix}.$$

Again, the DOFs related to the shared edge can be eliminated, as follows:

$$x_c = -[B^A_{22}+B^B_{11}]^{-1}[B^A_{21} \quad B^B_{12} \quad B^A_{23}+B^B_{13}]\begin{pmatrix} x_L \\ x_R \\ V \end{pmatrix}. \quad [26]$$

Back-substitution into the combined system matrix yields the cascaded B-matrix:

$$B^{AB} = \begin{bmatrix} B^A_{11} & 0 & B^A_{13} \\ 0 & B^B_{22} & B^B_{23} \\ B^A_{31} & B^B_{32} & B^A_{33}+B^B_{33} \end{bmatrix} - \quad [27]$$

$$\begin{bmatrix} B^A_{12} \\ B^B_{21} \\ B^A_{32}+B^B_{31} \end{bmatrix}[B^A_{22}+B^B_{11}]^{-1}[B^A_{21} \quad B^B_{12} \quad B^A_{23}+B^B_{13}].$$

This cascaded B-matrix satisfies:

$$B^{AB}\begin{pmatrix} x_L \\ x_R \\ V \end{pmatrix} = \begin{bmatrix} B^{AB}_{11} & B^{AB}_{12} & B^{AB}_{13} \\ B^{AB}_{21} & B^{AB}_{22} & B^{AB}_{23} \\ B^{AB}_{31} & B^{AB}_{32} & B^{AB}_{33} \end{bmatrix}\begin{pmatrix} x_L \\ x_R \\ V \end{pmatrix} = \begin{pmatrix} 0 \\ 0 \\ -Q \end{pmatrix}. \quad [28]$$

This cascaded B-matrix fully describes the response of the combined or cascaded unit block to electric excitation and boundary conditions. Also, the cascaded B-matrix is symmetric. The size of the cascaded B-matrix depends only on the electric connection and the number of DOFs at the edges. If all mesh edges are compatible with each other, the cascaded B-matrix has the same size as the original extended and/or cascaded B-matrices from which it was derived. Moreover, the cascaded B-matrices can be further cascaded to describe even longer structures. Hence, the B-matrix formalism can describe SAW structures from core blocks with a few, one, or no electrodes to cascaded unit blocks comprised of aggregated sequences of arbitrarily many electrodes. This is the power of the FEM hierarchical cascading technique. Thus, B-matrices describing smaller structures can be combined to obtain B-matrices describing larger structures, starting from individual electrodes and progressing to full multi-electrode devices.

It should be appreciated that, although only two B-matrices are described as being combined to create a C-matrix via equation [25], and then reduced via equations [26]-[28] to create a cascaded B-matrix, more than two B-matrices can be combined into a C-matrix, and then reduced to create a cascaded B-matrix. For example, three adjacent B-matrices can be cascaded by combining two adjacent ones of the B-matrices to create a C-matrix, and that C-matrix can be combined with adjacent B-matrix to create a bigger C-matrix that can then be reduced to a B-matrix fully describing the response of the three B-matrices. In fact, the cascading of any number of adjacent B-matrices can be performed without reducing the resulting C-matrices until needed.

It should be pointed out that the computational cost of constructing and cascading B-matrices is fairly high. However, what makes this approach very efficient is that the cascading operation can be carried out hierarchically: two B-matrices describing a pair of electrodes can be combined to obtain a B-matrix that describes four electrodes, two B-matrices describing four electrodes can be combined to obtain a B-matrix that describes eight electrodes, and so on. In periodic structures, the computational cost increases logarithmically with the number of electrodes.

The outcome of the FEM hierarchical cascading technique is a single cascaded B-matrix describing the entire SAW structure. To solve the model, the structure needs to be terminated with absorber blocks, such as PML absorber blocks, as described above and solved for external electric excitation. The desired voltage excitations may be expressed, as follows:

$V=\Delta V+e^T V_{ref}$ where $e$ is a $1 \times N_{port}$ matrix, and $N_{port}$ is the number of voltages. [29]

Charge neutrality is enforced by requiring that the sum over all surface charges vanishes, $eQ=1$. After these substitutions, the final system of equations takes the form:

$$\begin{bmatrix} B_{11}+B^{PML}_L & B_{12} & B_{13}e^T \\ B_{21} & B_{22}+B^{PML}_R & B_{23}e^T \\ eB_{31} & eB_{32} & eB_{33}e^T \end{bmatrix}\begin{pmatrix} x_L \\ x_R \\ V_{ref} \end{pmatrix} = -\begin{pmatrix} B_{13} \\ B_{23} \\ eB_{33} \end{pmatrix}\Delta V, \quad [30]$$

where $B^{PML}$ represent the B-matrices of the left- and right-hand PML absorber blocks. Any system equation for absorber blocks other than PML absorber blocks will take the similar form as equation [30]. Electric currents, field quantities, and other observables of interest can be calculated as a post-processing step.

It can be appreciated from the foregoing that the FEM hierarchical cascading technique described herein allows AW structures with a periodic block structure to be simulated in two dimensions with FEM, retaining the versatility of FEM, but with drastically reduced memory requirements and computational speed.

Figure 12:
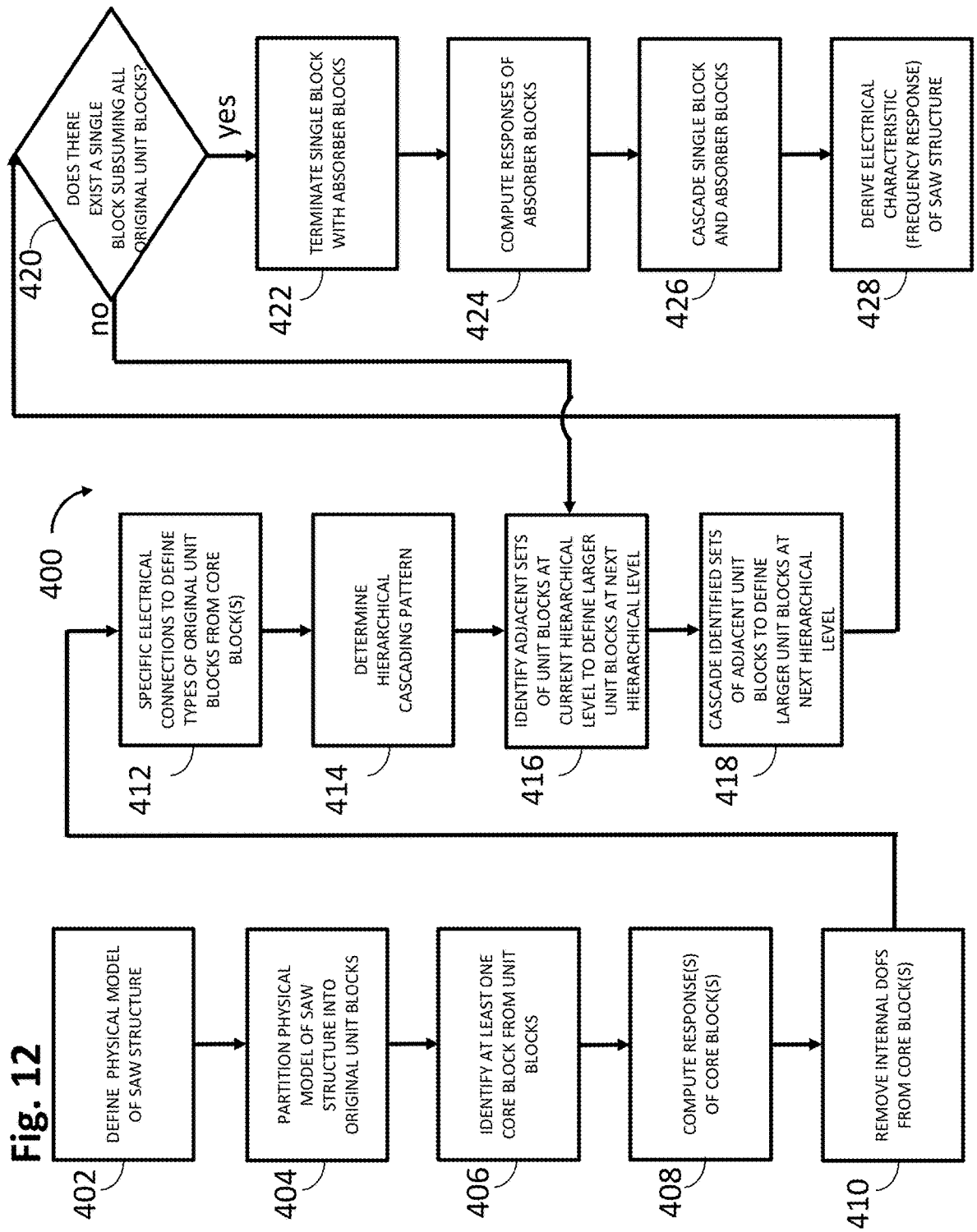
FIG. 12 is a flow diagram illustrating one method of simulating a SAW structure in accordance with the FEM hierarchical cascading technique.

Referring now to FIG. 12, one method 400 of simulating a microwave acoustic wave (AW) structure, and in particular the SAW structure 500 illustrated in FIG. 13, will be described. The SAW structure 500 takes the form of a synchronous resonator comprising an interdigitated transducer (IDT) 502 consisting of twenty-three electrodes (with twelve alternating one of these electrodes being connected to a signal bus bar 506), and eleven alternating ones of these electrodes connected to a ground bus bar 508), and a pair of reflectors 504a, 504b terminating the respective ends of the IDT 502 and each consisting of nine electrodes (all being connected to the ground bus bar 508), for a total of forty-one electrodes. All electrodes are assumed to have the identical shape and periodicity.

First, a physical model of the AW structure 500 is defined (step 402) and partitioned into a plurality of original unit blocks 510 (step 404). In the illustrated embodiment, each original unit block 510 comprises a single electrode, and as such, there is an equal number of forty-one original unit blocks 510. Next, at least one core block 512 is identified within the plurality of original unit blocks 510 (step 406). In the illustrated embodiment in FIG. 13, only one core block 512 is identified, and it is physically the same as all of the original unit blocks 510. As an illustrative example, the 2D cross-section of this core block 512 could resemble that of block 100c in FIG. 4. Of course, multiple core blocks 512 can be identified, which could resemble the core blocks 150a-150c illustrated in FIG. 6.

An FEM analysis is performed to compute the electrical characteristics of the core block(s) 512 (step 408) and produce a sparse, symmetric FEM system matrix, A, for each core block 512. As an illustrative example, the FEM meshing of the core block 512 could resemble that of block 300A in FIG. 10a. In the illustrated embodiment, the FEM is used to compute the DOFs in the form of acoustic and electric fields inside of the core block(s) 512 excited by the electric potential (if any) on the electrodes (if any) within the core block(s) 512 and the forces and electric potentials occurring at the boundaries of the core block(s) 512. Next, the internal DOFs are removed from each of the meshed core block(s) 512 (step 410) to produce reduced system matrices, B—the dense, symmetric "boundary matrices"—representing reduced core blocks that could resemble block 300b of FIG. 10b.

In the preferred embodiment, computing the response of each of the core blocks 512 using the FEM comprises generating an A-matrix (step 408) having left-side boundary DOFs, right-side boundary DOFs, and internal DOFs in accordance with equation [17], and removing the internal DOFs from the A-matrix to generate a B-matrix (step 410) comprising only the left-side boundary DOFs, the right-side boundary DOFs, and the electric potential and net surface charge on the electrode(s) (if any), in accordance with equations [18]-[20]. In addition, electrode resistive losses can be subsumed into the B-matrices in accordance with equation [22] as part of step 410.

Figure 3:
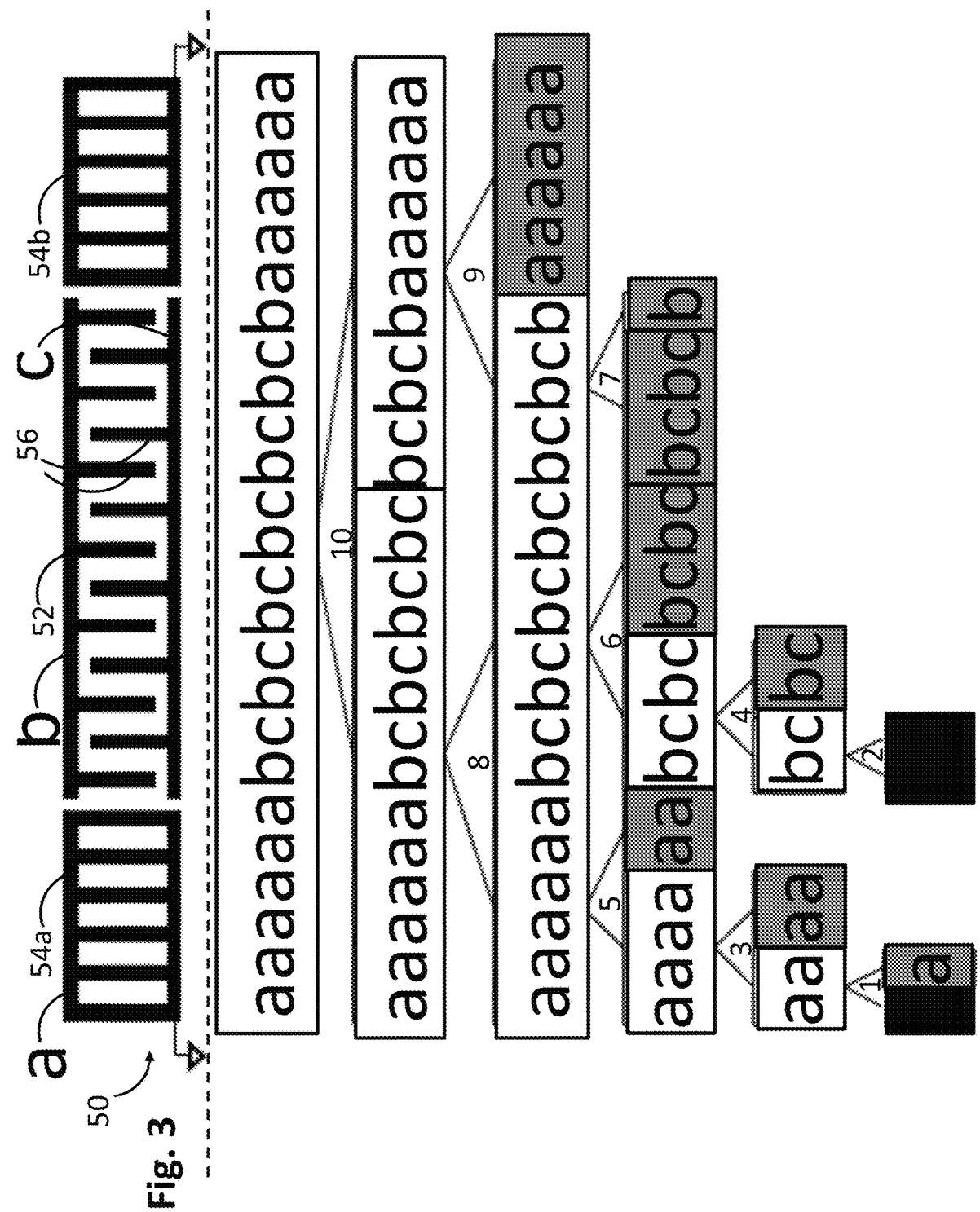
FIG. 3 is a 2D plan view of a synchronous SAW resonator simulated in accordance with a hierarchical cascading technique.
Figure 13:
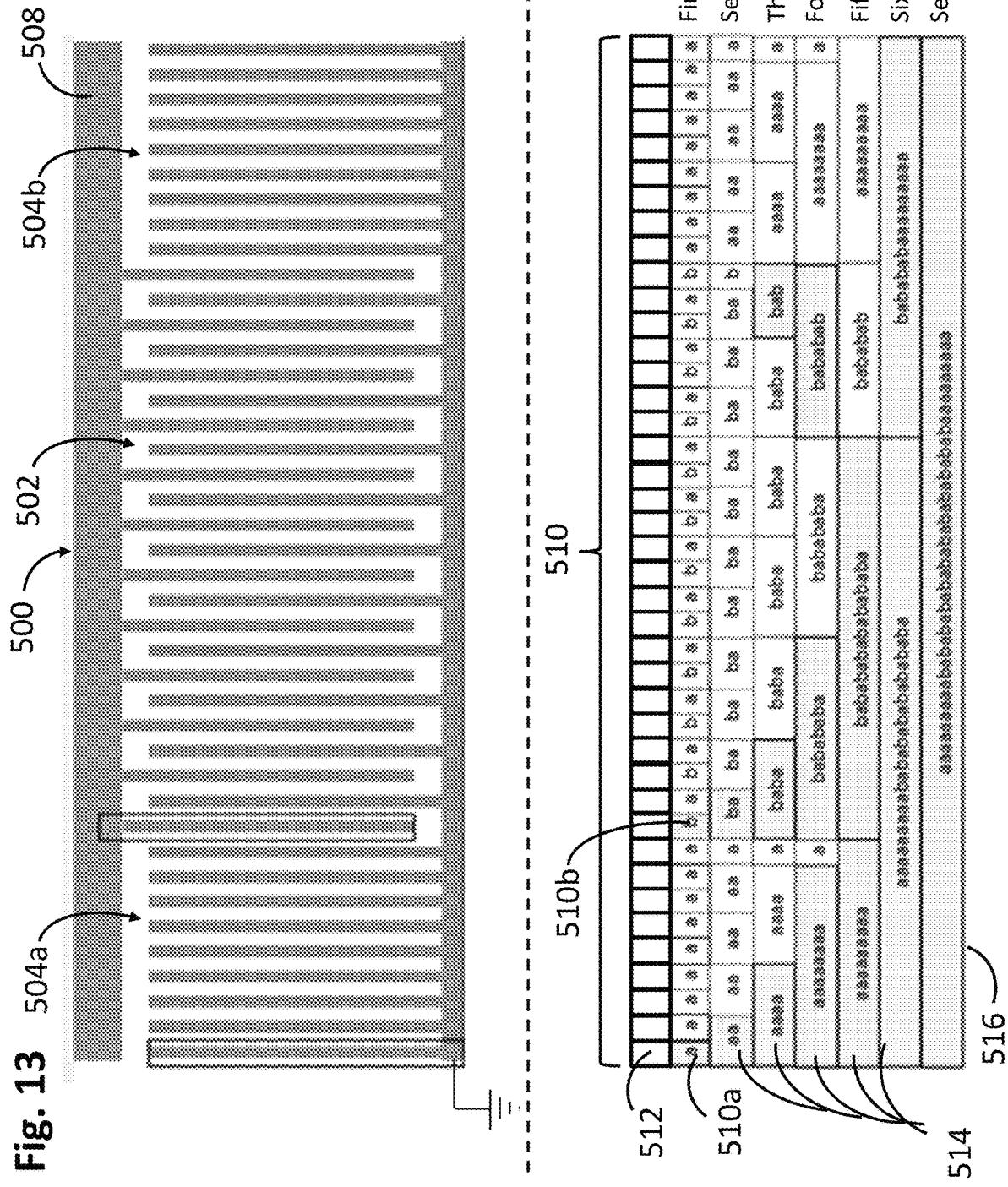
FIG. 13 is a plan view of a SAW structure, particularly showing the identification and cascading of adjacent block pairs of the SAW structure in accordance with the FEM hierarchical cascading technique described in FIG. 12.
Figure 14:
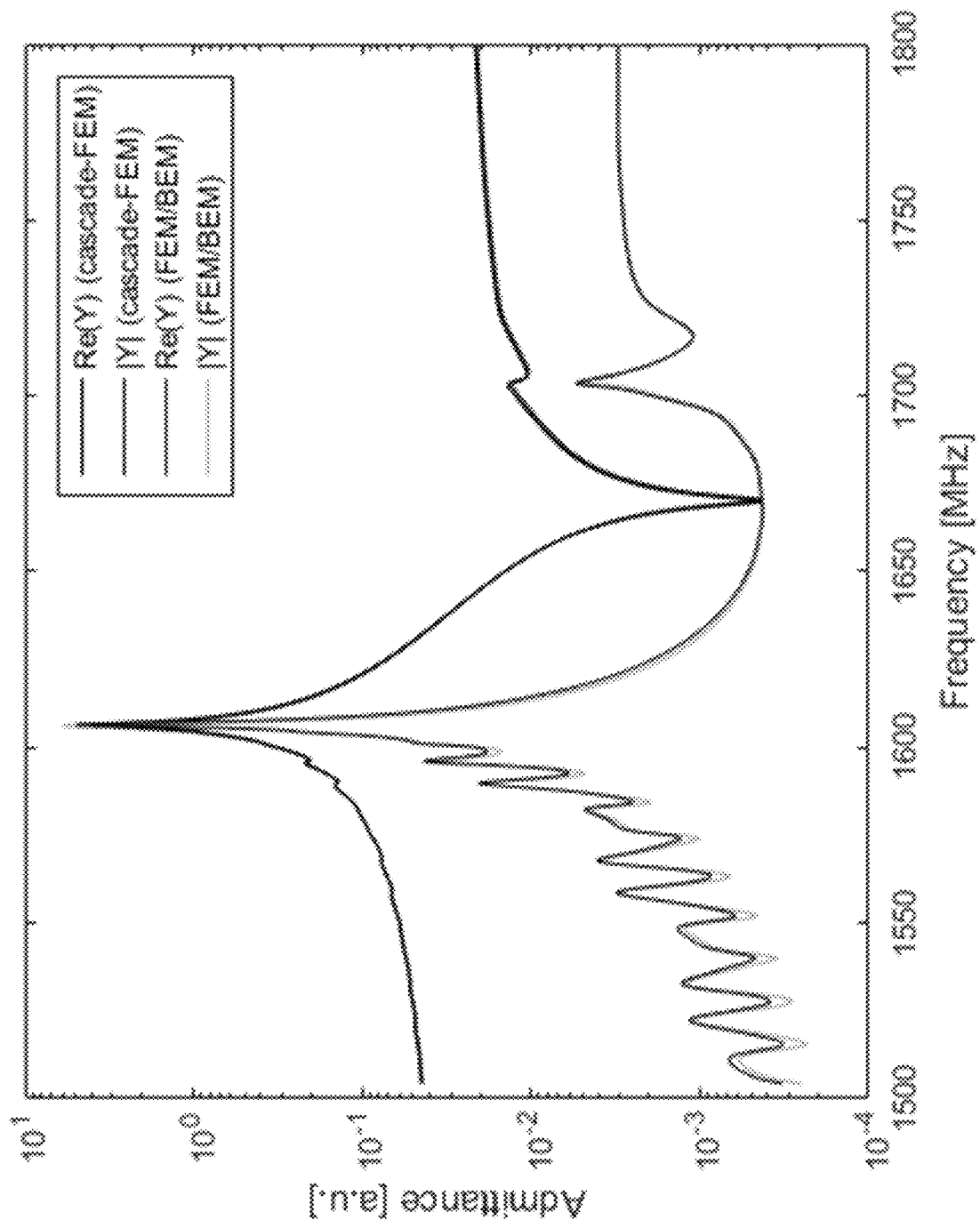
FIG. 14 is a plot illustrating a comparison between the simulation of a SAW resonator in accordance with the FEM hierarchical cascading technique described in FIG. 12, and a simulation of the SAW resonator in accordance with a prior art FEM/BEM analysis in terms of Y-parameters.

Next, the specified electrical connections, such as represented by the horizontal bus bars in FIGS. 3 and 13, are employed to form extended B-matrices (step 412) that define one or more types of original unit blocks 510 from each core-block B-matrix. In the preferred embodiment, step 412 is performed in accordance with equations [23]-[24].

In the illustrated embodiment in FIG. 13, two types of original unit blocks 510 are identified: unit block "b" (510b), which contains a "hot" electrode connected to the signal bus bar 508, and unit block "a" (510a), which contains a "cold" electrode connected to a ground bus bar 510. The series of original unit blocks 510 can be considered to be defined at the lowest (or first) hierarchical level, and can be combined to form larger cascaded unit blocks 514.

It should be appreciated that although it is advantageous to reduce the number of original unit blocks 510 down to a minimum number of types (each type with its own unique voltage), so that the unit blocks can be more efficiently cascaded down to a single block, not all of the original unit blocks 510, and even none of the original unit blocks 510, needs to be categorized into types of original unit blocks 510. Rather, each original unit block 510 can be defined without regarding to type (i.e., each of the twenty-three original unit blocks 510 would be considered to be unique). Although an FEM analysis need be performed on only one core block 512 in this case due to their identical physical structures, each original unit block 510 would be treated as being unique relative to the others (e.g., "a", "b", "c", "d", etc.) during the FEM hierarchical cascading process. In this case, the connectivity matrix defined in equation [23] can be built up during the cascading process to an N×N matrix, where N is the number of original unit blocks, and applied to the single all-subsuming block at the end to obtain an extended B-matrix (step 412).

After the types of original unit blocks 510 have been determined from both the core block(s) 512 and the electrical connections of the original unit blocks 510 that the respective core block(s) 512 physically represent, a hierarchical cascading pattern is determined from the nature and pattern of the original unit blocks 510 (step 414), and adjacent sets of unit blocks originating from the unit blocks "a" and "b" are either combined or transferred from their current hierarchical level to the next in accordance with the determined hierarchical cascading pattern until a single block 516 subsuming all of the original unit blocks 510 is realized. A set of adjacent blocks may, e.g., include only original unit blocks 510, at least one original unit block 510 and at least one cascaded unit block 514, or only cascaded unit blocks 514.

In particular, unique sets of adjacent original unit blocks 510 and/or cascaded unit blocks 514, together with any "orphaned" original unit blocks 510 or cascaded unit blocks 514, are identified at the current hierarchical level (step 416), and the responses (electrical characteristics) of each adjacent block set at this current hierarchical level are cascaded (combined) to determine the responses of larger blocks at the next hierarchical level and the "orphaned" blocks at this hierarchical level are simply transferred to the next hierarchical level (step 418).

In the preferred embodiment, cascading the responses of each set of adjacent unit blocks (either original or previously cascaded) consists of combining the extended and/or cascaded B-matrices of the respective set of adjacent unit blocks into a single new combined C-matrix having left-side boundary DOFs corresponding to the left-side boundary DOFs of a left one of the respective set of adjacent unit blocks, right-side boundary DOFs corresponding to a right one of the respective set of adjacent unit blocks, and internal DOFs (center DOFs in the case where the set of adjacent unit blocks only include two unit blocks) corresponding to shared edges or a shared edge between adjacent ones of the unit blocks in accordance with equation [25]; and removing the internal DOFs from the single new combined C-matrix to create a new cascaded B-matrix comprising only left-side boundary DOFs and right-side boundary DOFs in accordance with equations [26]-[28].

Of further note, once the characteristics of an original unit block 510 or cascaded unit block 514 are computed, such computed original unit blocks 510 or cascaded unit blocks 514 can be conveniently referenced during subsequent cascading operations at the same hierarchical level or at the next hierarchical level. For example, as illustrated in FIG. 13, the characteristics of the shaded unit blocks 510/514 are the only unit blocks 510/514 that require computation, whereas computation of the characteristics of the un-shaded unit blocks 510/514 is not required. Rather, the previously computed characteristics of the shaded unit blocks 510/514 can simply be used for the un-shaded unit blocks 510/514. Of course, if all of the original unit blocks 510 are treated as being unique as described above, all of the cascaded unit blocks 514 derived from these unique original unit blocks 510 would be unique, and as such, none can be referenced for subsequent cascading operations. For example, in this case, all of the unit blocks 510/514 in FIG. 13 would be shown as being shaded, since computations would need to be performed for each cascading operation.

If the current hierarchical level at step 416 is the first hierarchical level, the sets of adjacent original unit blocks 510 (in this case, adjacent unit block pairs) will be identified from all of the original unit blocks 510, with each unit block pair having respective individual block computed characteristics derived from the computed characteristics of at least one of the core blocks 512. For example, for the synchronous resonator 500 in FIG. 13, eight adjacent-unit block pairs "a/a" (four pairs associated with each reflector 504) are identified at the first hierarchical level and cascaded from unit block "a" into a larger cascaded unit block "aa" at the second hierarchical level; and eleven adjacent unit block pairs "b/a" associated with the IDT 502 are identified at the first hierarchical level and cascaded from unit block "a" and unit block "b" into a larger cascaded unit block "ba" at the second hierarchical level. Two "orphaned" unit blocks "a" (one associated with each reflector 504), and one "orphaned" unit block "b" associated with the IDT 502, are identified as such and transferred from the first hierarchical level to the second hierarchical level without cascading. Of course, in this case, prior to the cascading operation, the responses (electrical characteristics) of the two blocks in the adjacent unit block pair "a/a" are identical to each other (i.e., they are respectively identical to the computed response of unit block "a"); and the responses of the two blocks in the adjacent unit block pair "b/a" are different from each other (i.e., they are identical to the computed responses of unit block "b" and unit block "a", respectively).

Next, it is determined whether the FEM hierarchical cascading process has resulted in a single block 516 subsuming all of the original unit blocks 510 (step 420). If not, the process returns to step 416 where adjacent unit block pairs are identified at the current hierarchical level, and then continues on to step 418 where the responses of each adjacent unit block pair at this current hierarchical level are cascaded to define larger blocks at the next hierarchical level and orphaned unit blocks at the current hierarchical level are simply transferred to the next hierarchical level. Thus, adjacent unit block pairs are identified and cascaded, and orphaned unit blocks are identified and transferred, at steps 416 and 418 to gradually reduce the number of blocks until a single block 516 representing the entire AW structure is attained.

For example, for the synchronous resonator 500 in FIG. 13, four adjacent unit block pairs "aa/aa" (two pairs associated with each reflector 504) are identified at the second hierarchical level and cascaded from the block "aa" into a larger unit block "aaaa" at the third hierarchical level; five adjacent unit block pairs "ba/ba" associated with the IDT 502 are identified at the second hierarchical level and cascaded from the block "ba" into a larger unit block "baba" at the third hierarchical level; and one adjacent unit block pair "ba/b" is identified at the second hierarchical level and cascaded from the unit block "ba" and previously orphaned unit block "b" into a larger unit block "bab" at the third hierarchical level. The previously orphaned unit blocks "a" remain orphaned and are passed from the second hierarchical level to the third hierarchical level without cascading.

Then, two adjacent unit block pairs "aaaa/aaaa" (one pair associated with each reflector 504) are identified at the third hierarchical level and cascaded from the unit block "aaaa" into a larger unit block "aaaaaaaa" at the fourth hierarchical level; two adjacent unit block pairs "baba/baba" associated with the IDT 502 are identified at the third hierarchical level and cascaded from the unit block "baba" into a larger unit block "bababbaba" at the fourth hierarchical level; and one adjacent unit block pair "baba/bab" is identified at the third hierarchical level and cascaded from the unit block "baba" and block "bab" into a larger unit block "bababab" at the fourth hierarchical level. The previously orphaned unit blocks "a" remain orphaned and are passed from the third hierarchical level to the fourth hierarchical level without cascading.

Then, two adjacent unit block pairs "aaaaaaaa/a" (one pair associated with each reflector 504) are identified at the fourth hierarchical level and cascaded from the unit block "aaaaaaaa" and the previously orphaned unit block "a" into a larger unit block "aaaaaaaaa" at the fifth hierarchical level; two adjacent unit block pairs "babababa/babababa" associated with the IDT 502 are identified at the fourth hierarchical level and cascaded from the unit block "babababa" into a larger unit block "bababababababa" at the fifth hierarchical level. One orphaned unit block "bababab" associated with the IDT 502 is identified as such and passed from the fourth hierarchical level to the fifth hierarchical level without cascading.

Then, one adjacent unit block pair "aaaaaaaaa/babababababababa" is identified at the fifth hierarchical level and cascaded from the unit block "aaaaaaaaa" and the unit block "bababababababa" into a larger unit block "aaaaaaaaababababababababa" at the sixth hierarchical level; and another adjacent unit block pair "bababab/aaaaaaaaa" is identified at the fifth hierarchical level and cascaded from the unit block "aaaaaaaaa" and the unit block "bababababababa" into a larger unit block "bababababaaaaaaaaa" at the sixth hierarchical level. Then, the remaining adjacent unit block pair "aaaaaaaaababababababababa/bababababaaaaaaaa" is identified at the sixth hierarchical level and cascaded from the unit block "aaaaaaaaababababababababa" and the unit block ""babababababababa" into a single larger block "aaaaaaaaababababababababababababaaaaaaaaa" at the seventh and last hierarchical level. As can be appreciated, this single cascaded block subsumes all of the original unit blocks. Only thirteen cascading operations are required to progress from the forty-one (single-electrode) original unit blocks 510 to the single (41-electrode) cascaded unit block.

Next, if it is determined that the FEM hierarchical cascading process results in a single block 516 subsuming all of the original unit blocks 510 at step 420, the left and right sides of the single block 516 are terminated with absorber blocks (step 422), responses of each of the absorber blocks are computed (step 424), and the responses (electrical characteristics) of the single block 516 and absorber blocks are cascaded (combined) (step 426), which in the case of PML absorber blocks will result in equation [30]. It should be noted that the responses of the absorber blocks can be computed at any time in the process, and need not be performed at step 424. It should also be noted that if the connectivity matrix of equation [23] was not applied to the core blocks 512 to create original unit blocks 510 at step 412, the accumulated connectivity matrix can be applied to the single block 516 immediately after step 420. Next, at least one electrical characteristic of the SAW structure (e.g., the frequency-dependent admittance parameters) is derived from the cascaded electrical characteristics of the single block and the two absorber blocks, which in the case of PML absorber blocks, can be derived from solving equation [30] (step 428). From equation [30], the full field solution can be recovered by an inverse cascading process; i.e., the internal degrees-of-freedom are calculated backwards from the field values at block edges.

The FEM hierarchical cascading technique described herein was implemented on a commercial Matlab platform to simulate a synchronous resonator consisting of a 42° YX-cut $LiTaO_3$ substrate, an IDT, and a pair of reflectors. The geometry of the synchronous resonator consisted of: an electrode pitch of 1.23 µm, aluminum electrodes with a metallization ratio of 0.55 and thickness of 181 nm, an acoustic aperture 49.2 µm wide, an IDT with 241 electrodes, and two reflectors, each reflector having 40 electrodes. The substrate was simulated using Kovacs constants (see G. Kovacs, M. Anhorn, H. E. Engan, G. Visintini, and C. C. W. Ruppel, "Improved material constants for $LiNbO_3$ and $LiTaO_3$," Proceedings 1990 IEEE Ultrasonics Symposium., pp. 435-438, 1990). Viscous losses were modeled through an imaginary component added to the elastic constants. Electrode resistivity was modeled phenomenologically.

An FEM simulation was needed for only a single core block (a single electrode; a single period) and the two PML absorber blocks. The FEM models with quadratic and cubic elements used 6636 and 14625 DOFs, respectively. Note that in conventional FEM this would mean a device model with 2.7 and 5.9 million variables, respectively. The simulation was run using a desktop PC (CPU i7-2600k, 3.4 GHz, 16 GB RAM) and the computation was distributed to four parallel threads. The achieved simulation speeds were 2.4 seconds and 9.6 seconds per frequency point, respectively.

To validate the accuracy of the simulation, the same synchronous resonator was also simulated using a FEM/BEM-based simulation tool FEMSAW and compared to the simulation performed by the FEM hierarchical cascading technique. As illustrated in FIG. 13, there are very small differences between respective stimulations (in this case, the real portion of the admittance (Re(Y)) and the absolute admittance (|Y|) computed over the frequency range 1500 MHz-1800 MHz) of the FEM hierarchical cascading technique and the reference FEM/BEM. These small differences are mostly due to differences in the modeling of resistivity.

In some applications, it may be desirable to compute the responses of a family of closely related AW structures in relation to changes in the finite size of the AW structures. This can efficiently be accomplished by re-using previously computed core blocks or previously computed cascaded unit blocks. For example, a parameter sweep where the number of electrodes in the transducer of a synchronous resonator may be varied over a relatively wide range. As another example, small variations in the finite number of electrodes in a transducer or reflector of a synchronous resonator may be made so as to affect the frequency and amplitude of small ripples in the admittance of the AW structure. Previously computed core blocks may be used to construct the cascaded responses of the entire set of closely related, full, finite-size AW structure responses without requiring the computation of the same core blocks. As still another example, the geometry of reflector electrodes (pitch or electrode width) may be changed, while maintaining a fixed transducer. In this case, the responses of additional, new, core blocks may need to be computed, although a previously computed core block may be re-used efficiently.

In the preferred embodiment, the responses of core blocks and intermediate "already known cascaded unit blocks" can be stored in memory, and be re-used in the set of cascading operations for generating the responses of the family of closely related AW structures. However, in alternative embodiments, it may be sufficient to only store the responses of core blocks for subsequent re-use in cascading operations. The time that it takes to store the responses of the core blocks to an appropriate storage medium (e.g., solid state drive, hard drive, network, cloud storage or equivalent, or even a database) can be less than the time required to re-compute the responses of the core blocks from the geometry of the AW structure.

Figure 15:
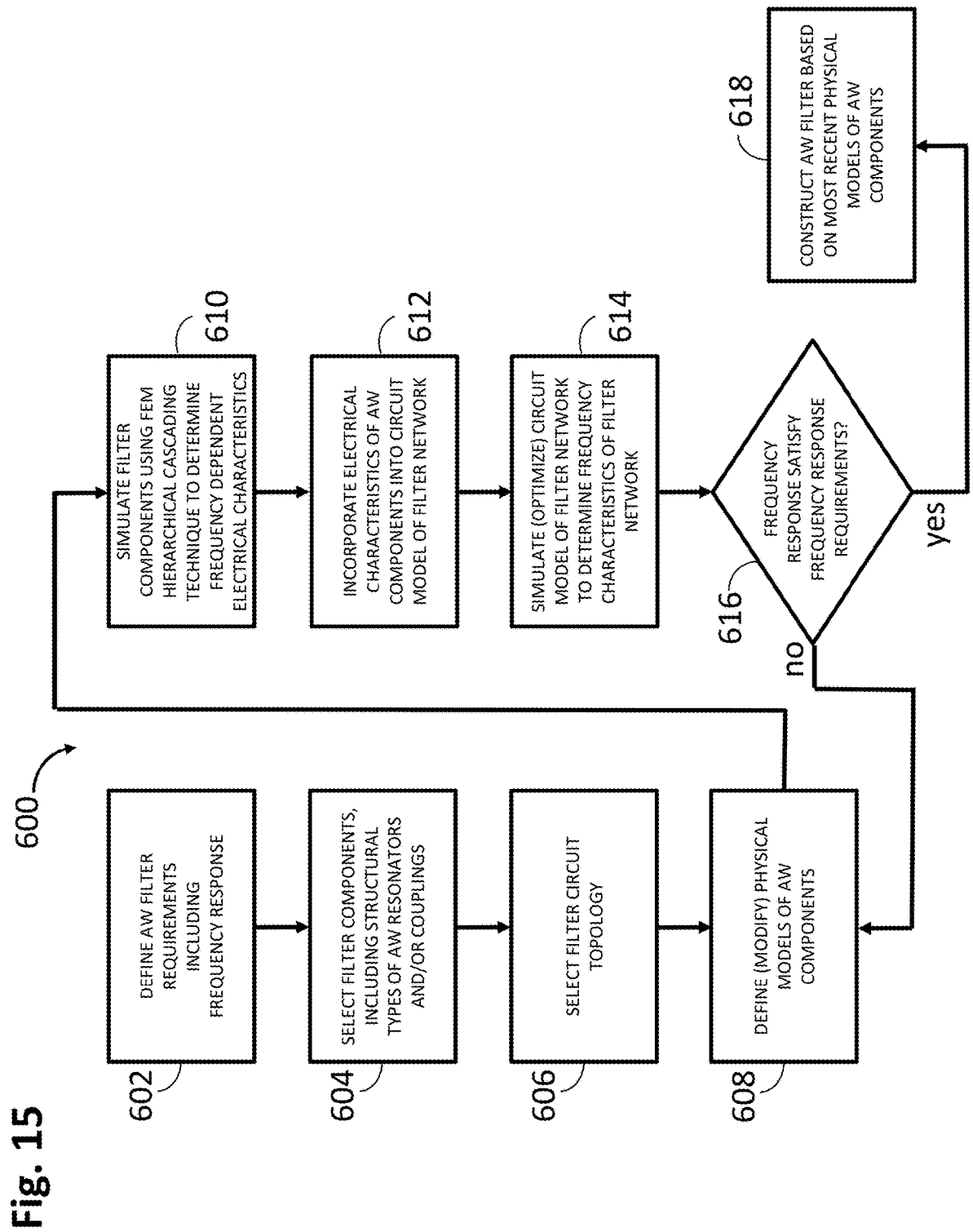
FIG. 15 is a flow diagram illustrating the design and construction of an actual AW filter using the FEM hierarchical cascading technique.

Referring now to FIG. 15, one exemplary technique 600 for designing an AW microwave filter using the FEM hierarchical cascading technique will be described. First, the filter requirements, which comprise the frequency response requirements (including passband, return loss, insertion loss, rejection, linearity, noise figure, input and output impedances, etc.), as well as size and cost requirements, and environmental requirements, such as operating temperature range, vibration, failure rate, etc., are define to satisfy the application of the filter (step 602).

Next, the structural types of circuit elements to be used in the AW filter are selected; for example, the structural type of AW resonators and/or coupling elements (SAW, BAW, FBAR, MEMS, etc.) and the types of inductors, capacitors, and switches, along with the materials to be used to fabricate these circuit elements, including the packaging and assembly techniques for fabricating the filter, are selected (step 604). For example, as discussed above, SAW resonators may be selected, which may be fabricated by disposing IDTs on a piezoelectric substrate, such as crystalline Quartz, Lithium Niobate ($LiNbO_3$), Lithium Tantalate ($LiTaO_3$) crystals or BAW (including FBAR) resonators or MEMS resonators. In the particular example described herein, the selected circuit element types are SAW resonators and capacitors constructed on a substrate composed of 42-degree X Y cut $LiTaO_3$.

Then, a filter circuit topology is selected (step 606). For example, the selected filter circuit topology may be an Nth-order ladder topology (in this case, N=6 meaning the number of resonators equals 6). Nth order ladder topologies are described in U.S. Pat. Nos. 8,751,993 and 8,701,065 and U.S. patent application Ser. No. 14/941,451, entitled "Acoustic Wave Filter with Enhanced Rejection," which are all expressly incorporated herein by reference. Other filter circuit topologies, such as in-line non-resonant-node, or in-line, or in-line with cross couplings, or in-line non-resonant node with cross couplings, etc., may be selected.

Then, initial physical models of the filter's AW components are defined (or modified), e.g., by selecting a material, one or more of a number of finger pairs, aperture size, mark-to-pitch ratio, and/or transducer metal thickness (step 608), and the physical models of the AW components are simulated using the FEM hierarchical cascading technique to determine their frequency-dependent electrical characteristics (step 610). Next, these electrical characteristics of the AW components are incorporated into a circuit model of the entire filter network (step 612), and the circuit model of the filter network is simulated (optionally optimizing non-AW component parameters) to determine the filter's frequency characteristics (step 614). The simulated frequency response of the AW filter is then compared to the frequency response requirements defined at step 602 (step 616). If the simulated frequency response does not satisfy the frequency response requirements, the process returns to step 608, where the physical model of the AW is modified. If the simulated frequency response does satisfy the frequency response requirements (step 602), an actual acoustic filter is constructed based on the most recent physical models of the AW components (step 614). Preferably, the circuit element values of the actual acoustic filter will match the corresponding circuit element values in the most recent optimized filter circuit design.

The FEM hierarchical cascading technique described herein was implemented on a commercial Matlab platform to simulate a CRF consisting of a 42° YX-cut LiTaO$_3$ substrate. The CRF has a symmetric R-T2-T1-T2-T1-T2-R structure with electrode count 60-31-43-49-43-31-60. The periodicity varies in the range 1.26-1.28 µm, the electrode thickness is 8%, the metallization ratio is 0.6, and the acoustic aperture width is 90 µm. The substrate was simulated using Kovacs constants (see G. Kovacs, M. Anhorn, H. E. Engan, G. Visintini, and C. C. W. Ruppel, "Improved material constants for LiNbO$_3$ and LiTaO$_3$," Proceedings 1990 IEEE Ultrasonics Symposium, pp. 435-438, 1990). Viscous losses were modeled through an imaginary component added to the elastic constants. Electrode resistivity was modeled phenomenologically.

An FEM simulation was needed for three core blocks (three electrode types; three periods) and the two PML absorber blocks. The respective models had 6643-7749 DOFs. In addition, both PML blocks had 15184 DOFs. The simulation was run using a desktop PC (CPU i7-2600 k, 3.4 GHz, 16 GB RAM) and the computation was distributed to four parallel threads. The achieved simulation speeds were 3.6 seconds per frequency point.

Figure 16:
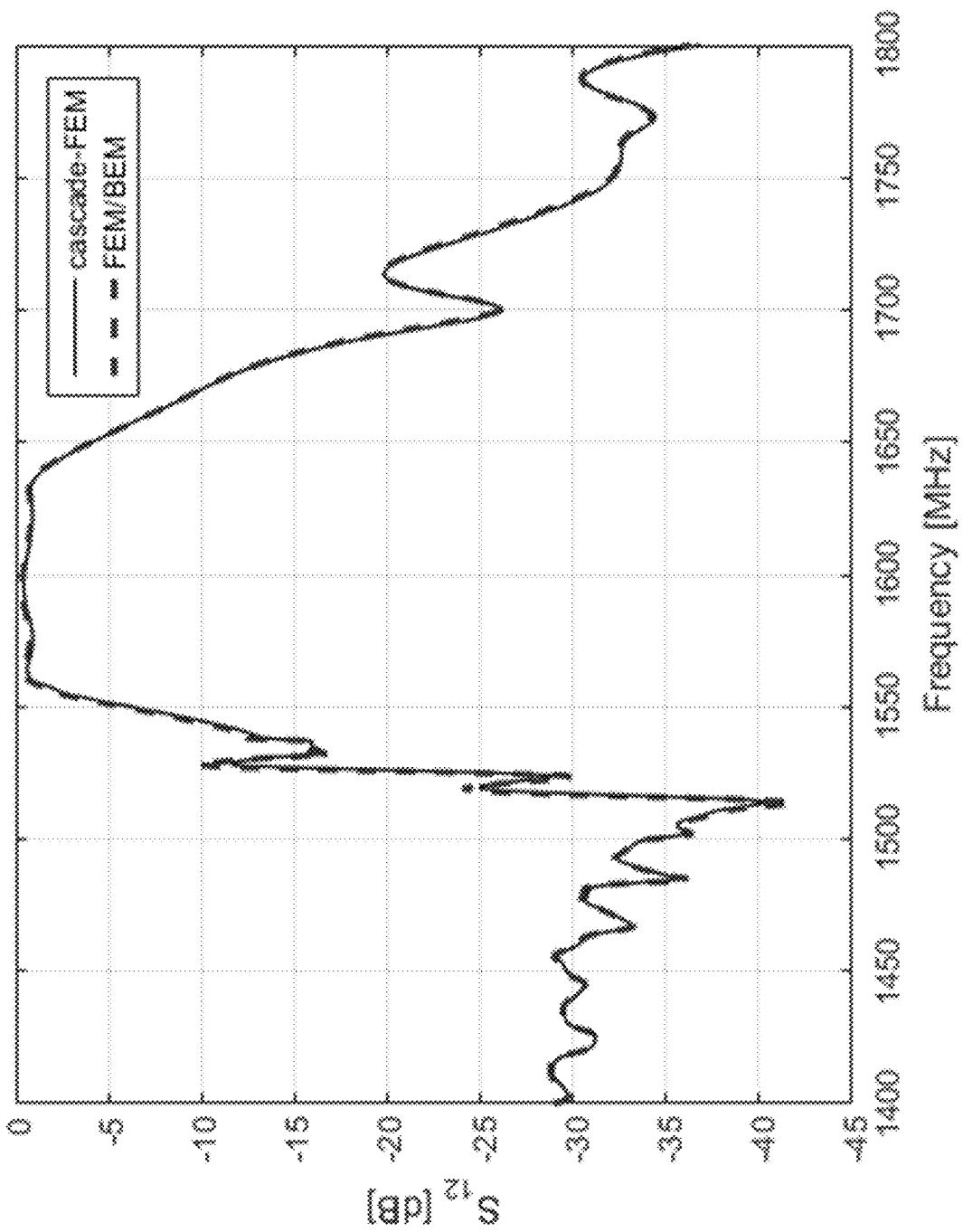
FIG. 16 is a plot illustrating a comparison between the simulation of a Coupled Resonator Filter (CRF) in accordance with the FEM hierarchical cascading technique described in FIG. 12, and a simulation of the CRF in accordance with a prior art FEM/BEM in terms of insertion loss.

To validate the accuracy of the simulation, the same CRF was also simulated using a FEM/BEM-based simulation tool, FEMSAW, and compared to the simulation performed by the FEM hierarchical cascading technique. As illustrated in FIG. 16, there are very small differences in the insertion loss between respective stimulations of the FEM hierarchical cascading technique and the reference FEM/BEM. These small differences are mostly due to differences in the modeling of resistivity.

Although the FEM hierarchical cascading technique has been disclosed herein as being applied to SAW structures having strict periodicity, it should be appreciated that the FEM hierarchical cascading technique can be applied to devices having breaks in periodicity, such as "hiccup" resonators or devices with "accordion sections," examples of which are described in J. Meltaus, V. P. Plessky, and S. S. Hong, "Non-Synchronous Resonators on Leaky Substrates," Proc. Of the 2005 IEEE Ultrasonics Symposium, pp. 2153-2156; P. V. Wright, "A Review of SAW Resonator Filter Technology," 1992 Ultrasonics Symposium, pp. 29-38; and V. Plessky and J. Koskela, "Coupling-of-Modes Analysis of SAW Devices," International Journal of High Speed Electronics and Systems," Vol. 10, No. 4, (2000), pp. 867-947). In the case of such devices, the FEM hierarchical cascading technique can be applied to the strictly periodic structures, whereas "one-off" cells or small number of aperiodic cells can be inserted between the periodic sections. Also, it should be clear to a person skilled in the art that the term "SAW," as used herein, includes all types of acoustic waves, such as quazi-Rayleigh waves, "leaky" SAW, Surface Transverse Waves, STW, Lamb modes, etc.—that is, all types of acoustic waves with propagation mainly near the surface of, or in a layer of limited depth, for which components radiated into the bulk represent undesirable "second-order" effects.

Figure 17:
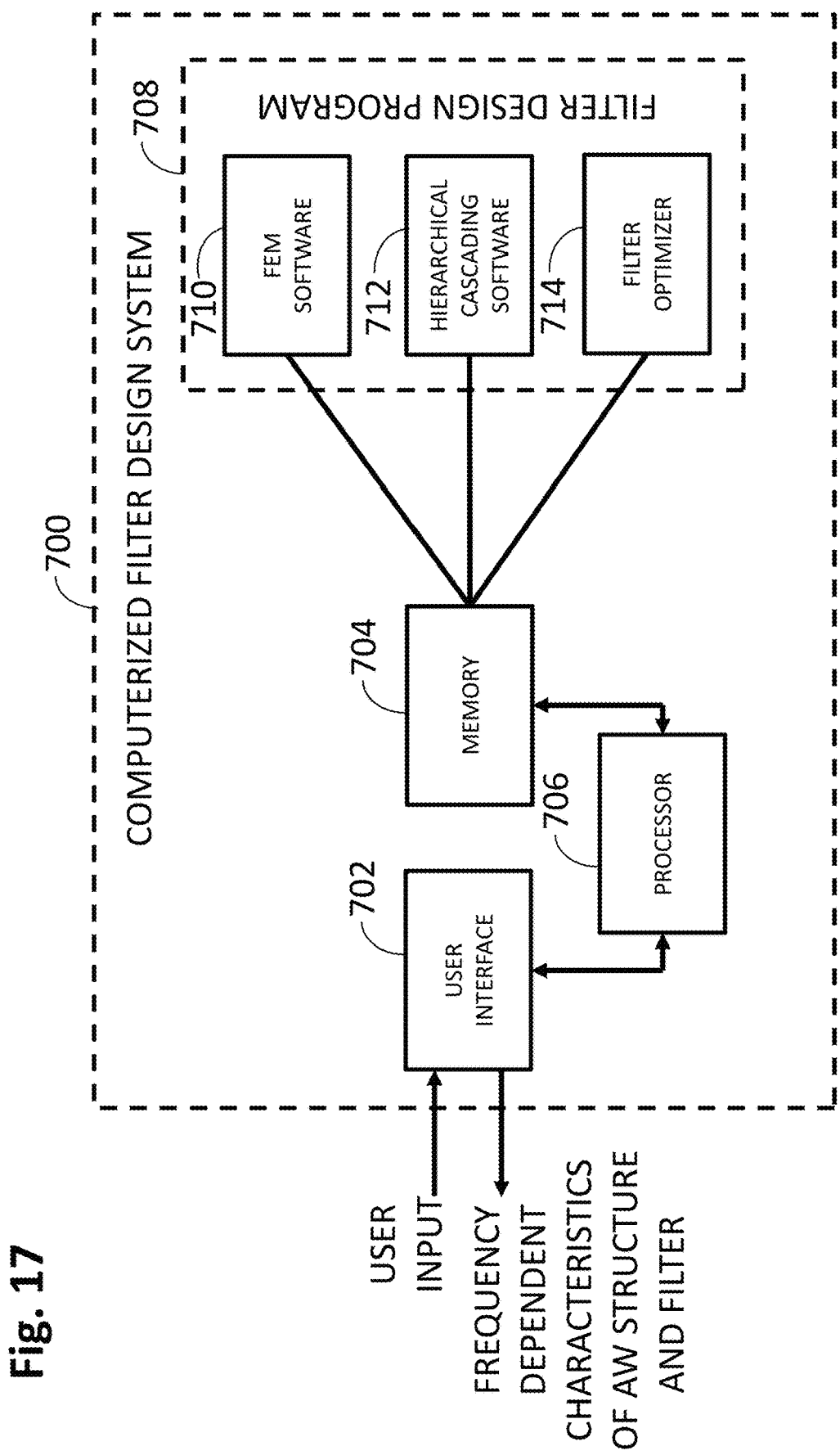
FIG. 17 is a block diagram of a computerized AW structure simulation system that can implement the computational steps of the simulation method of FIG. 12.

Referring to FIG. 17, a computerized filter design system 700 may be used to simulate an AW structure and an AW filter using design procedures 400 and 600, respectively. The computerized filter design system 700 generally comprises a user interface 702 configured for receiving information and data from a user (e.g., parameter values defining the physical model of the AW structure at step 402 and AW filter requirements at step 602) and outputting frequency-dependent characteristics of the AW structure and filter to the user (such as at steps 428 and 614, respectively); a memory 704 configured for storing a filter design program 708 (which may take the form of software instructions, which may include, but are not limited to, routines, programs, objects, components, data structures, procedures, modules, functions, and the like that perform particular functions or implement particular abstract data types), as well as the information and data input from the user via the user interface 702; and a processor 706 configured for executing the simulation software program.

The simulation software program 708 is divided into sub-programs, in particular, a conventional FEM program 710 (which can be used to compute characteristics of the core blocks at step 408 and PML absorber blocks at step 426); a hierarchical cascading program 712 (which can be used to partition the physical model at step 404, identify core blocks at step 406, compute the characteristics of the core blocks at step 408, remove DOFs from core blocks at step 410, define types of unit blocks at step 412, determine hierarchical cascading pattern at step 414, identify and cascade sets of adjacent unit blocks at steps 416-418, recognize a single unit block subsuming all original unit blocks at step 420, terminate the single block with absorber blocks at step 422, compute characteristics of absorber blocks at step 424, cascade the single subsuming block with the absorber blocks at step 426, and determine the frequency-dependent electrical characteristics of the entire terminated AW structure at step 426; and a conventional filter optimizer 714 (which can be used to optimize and simulate the circuit model of the filter network at 614).

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. For example, the present invention has applications well beyond filters with a single input and output, and particular embodiments of the present invention may be used to form duplexers, multiplexers, channelizers, reactive switches, etc., where low-loss frequency-selective circuits may be used. Thus, the present invention is intended to cover alternatives, modifications, and equivalents that may fall within the spirit and scope of the present invention as defined by the claims.

What is claimed is:

1. A method of generating an optimized microwave acoustic wave (AW) structure, comprising:
receiving, by a computing system, a set of frequency response requirements and a physical model of the AW structure;
partitioning, by the computing system, the physical model into a first plurality of unit blocks;

identifying, by the computing system, at least one core block within the first plurality of unit blocks;

computing, by the computing system, characteristics of each of the at least one core block;

deriving, by the computing system, characteristics for each unit block of a second plurality of unit blocks from the computed characteristics of the at least one core block, the second plurality of unit blocks comprising a subset of unit blocks of the first plurality of unit blocks not including the at least one core block;

combining, by the computing system, the second plurality of unit blocks into a single block having computed characteristics derived from the derived characteristics of each unit block of the second plurality of unit blocks and the computed characteristics of the at least one core block by hierarchically cascading sets of adjacent unit blocks into the single block, such that the single block subsumes the second plurality of unit blocks;

deriving, by the computing system, a frequency response of the AW structure at least partially from the computed characteristics of the single block;

comparing, by the computing system, the frequency response to the set of frequency response requirements; and optimizing, by the computing system, the AW structure based on the comparison to provide an optimized design, the optimized design serving as an input to a manufacturing process.

2. The method of claim 1, further comprising:
identifying, by the computing system, electrical connections to the second plurality of unit blocks; and
deriving, by the computing system, electrical characteristics for each unit block of the second plurality of unit blocks from the identified electrical connections.

3. The method of claim 1, wherein the computed characteristics of each unit block of the second plurality of unit blocks and the computed characteristics of the at least one core block comprise acoustic and electric fields.

4. The method of claim 1, wherein all of the unit blocks are physically identical to each other.

5. The method of claim 1, wherein at least two of the unit blocks are physically different from each other, and the at least one core block comprises at least two core blocks.

6. The method of claim 1, wherein at least one of the sets of adjacent unit blocks is a pair of adjacent unit blocks.

7. The method of claim 1, wherein hierarchically cascading sets of the adjacent unit blocks into the single block, comprises:
(a) combining sets of adjacent unit blocks at a current hierarchical level to create cascaded unit blocks at a next hierarchical level; and
(b) repeating step (a) for sets of adjacent unit blocks for the next hierarchical level until the single block is created, wherein each of the unit blocks is either an original unit block or a previously cascaded unit block.

8. The method of claim 7, wherein any of the unit blocks that are not combined at the current hierarchical level are transferred from the current hierarchical level to the next hierarchical level.

9. The method of claim 7, wherein a first unit block has previously computed characteristics, and at least one other of the unit blocks is physically and electrically identical to the first unit block, the method further comprising referencing the first unit block to assume the previously computed characteristics for the at least one other unit block when combining the sets of adjacent unit blocks at the current hierarchical level.

10. The method of claim 1, wherein computing the characteristics of each of the at least one core block uses a Finite Element Method (FEM).

11. The method of claim 10, wherein computing the characteristics of each of the least one core block using the FEM, comprises:
generating an A-matrix having left-side boundary degrees of freedom (DOFs), right-side boundary DOFs, and internal DOFs; and
removing the internal DOFs from the A-matrix to generate a B-matrix comprising only the left-side boundary DOFs and the right-side boundary DOFs.

12. The method of claim 11, wherein the characteristics of each of the second plurality of unit blocks is represented by a B-matrix derived from the at least one B-matrix of the at least one core block.

13. The method of claim 12, wherein combining the second plurality of unit blocks comprises:
identifying a first set of adjacent unit blocks;
cascading the first set of adjacent unit blocks into a first cascaded unit block by:
combining the B-matrices of the respective adjacent unit blocks of the first set into a first C-matrix having left-side boundary DOFs corresponding to the left-side boundary DOFs of a left one of the adjacent unit blocks, right-side boundary DOFs corresponding to a right one of the adjacent unit blocks, and internal DOFs corresponding to at least one shared edge between the adjacent unit blocks; and
reducing the first C-matrix by removing the internal DOFs from the first C-matrix to a first new cascaded B-matrix of a first cascaded unit block comprising only left-side boundary DOFs and right-side boundary DOFs.

14. The method of claim 13, wherein combining the second plurality of unit blocks further comprises:
identifying a second set of adjacent unit blocks;
cascading the second set of adjacent unit blocks into a second cascaded unit block by:
combining the B-matrices of the respective adjacent unit blocks of the second set into a second C-matrix having left-side boundary DOFs corresponding to the left-side boundary DOFs of a left one of the adjacent unit blocks, right-side boundary DOFs corresponding to a right one of the adjacent unit blocks, and internal DOFs corresponding to at least one shared edge between the adjacent unit blocks; and
reducing the second C-matrix by removing the internal DOFs from the second C-matrix to a second new cascaded B-matrix of a second cascaded unit block comprising only left-side boundary DOFs and right-side boundary DOFs.

15. The method of claim 14, wherein combining the second plurality of unit blocks further comprises:
identifying the first and second cascaded unit blocks as being a set of adjacent cascaded unit blocks; and
further cascading the set of adjacent cascaded unit blocks into a third cascaded unit block by:
combining the B-matrices of the respective adjacent cascaded unit blocks of the set of cascaded unit blocks into a third C-matrix having left-side boundary DOFs corresponding to the left-side boundary DOFs of a left one of the adjacent cascaded unit blocks, right-side boundary DOFs corresponding to a right one of the adjacent cascaded unit blocks, and internal DOFs corresponding to at least one shared edge between the adjacent cascaded unit blocks; and reducing the third C-matrix by removing the internal DOFs from the third C-matrix to a third new cascaded B-matrix of a third cascaded unit block comprising only left-side boundary DOFs and right-side boundary DOFs.

16. The method of claim 1, wherein the physical model of the AW structure defines a two-dimensional cross-section and an aperture of the AW structure, and the physical model is partitioned, such that each original unit block includes a portion of the two-dimensional cross-section and a portion of the aperture of the AW structure.

17. The method of claim 1, wherein the physical model of the AW structure comprises at least one electrode, a substrate layer, and a vacuum layer.

18. The method of claim 17, wherein the physical model of the AW structure further comprises an absorber layer adjacent the substrate layer, and an absorber layer adjacent the vacuum layer.

19. The method of claim 17, wherein one of the at least one core block contains an electrode.

20. The method of claim 1, further-comprising:
further partitioning the physical model further into two absorber blocks that respectively terminate on the left and right sides of the single block;
computing responses of each of the two absorber blocks;
combining the single block and two absorber blocks into a comprehensive block having computed characteristics;
wherein the at least one electrical characteristic of the physical model is derived at least partially from the computed characteristics of the comprehensive block.

21. The method of claim 1, wherein the AW structure comprises an acoustic resonator.

22. The method of claim 1, further comprising deriving at least one of a static capacitance, and a resonant frequency of the AW structure at least partially from the computed characteristics of the single block.

23. The method of claim 1, further comprising:
directing a second computing system to fabricate the AW filter based on the optimized design.

24. The method of claim 1, wherein the first plurality of unit blocks comprises at least one additional unit block separate from the second plurality of unit blocks and the at least one core block.

25. A filter design system, comprising:
a processor;
an interface coupled to the processor; and
memory storing a hierarchical cascading program that, when executed by the processor, causes the filter design system to perform actions comprising:
receiving a set of frequency response requirements and a physical model of the AW structure;
partitioning the physical model into a first plurality of unit blocks;
identifying at least one core block within the first plurality of unit blocks;
computing characteristics of each of the at least one core block;
deriving characteristics for each unit block of a second plurality of unit blocks from the computed characteristics of the at least one core block, the second plurality of unit blocks comprising a subset of unit blocks of the first plurality of unit blocks not including the at least one core block;
combining the second plurality of unit blocks into a single block having computed characteristics derived from the derived characteristics of each unit block of the second plurality of unit blocks and the computed characteristics of the at least one core block by hierarchically cascading sets of adjacent unit blocks into the single block, such that the single block subsumes the second plurality of unit blocks;
deriving a frequency response of the AW structure at least partially from the computed characteristics of the single block;
comparing the frequency response to the set of frequency response requirements; and
optimizing the AW structure based on the comparison to provide an optimized design, the optimized design serving as an input to a manufacturing process.

* * * * *